United States Patent [19]

Ando et al.

[11] Patent Number: 5,303,990
[45] Date of Patent: Apr. 19, 1994

[54] BRAKE FLUID PRESSURE CONTROL APPARATUS

[75] Inventors: Hiromi Ando; Satoru Suga, both of Yamanashi, Japan

[73] Assignee: Tokico Ltd., Kanagawa, Japan

[21] Appl. No.: 40,658

[22] Filed: Mar. 31, 1993

Related U.S. Application Data

[62] Division of Ser. No. 904,988, Jun. 26, 1992.

[30] Foreign Application Priority Data

| Jul. 3, 1991 | [JP] | Japan | 3-163118 |
| Nov. 7, 1991 | [JP] | Japan | 3-291772 |
| Dec. 16, 1991 | [JP] | Japan | 3-332296 |
| Mar. 5, 1992 | [JP] | Japan | 4-48917 |
| Mar. 5, 1992 | [JP] | Japan | 4-48918 |

[51] Int. Cl.$^5$ .............................................. B60T 13/18
[52] U.S. Cl. ............................ 303/117.1; 303/116.1; 303/900
[58] Field of Search ............ 303/117.1, 10, 11, 116.1, 303/116.2, 900

[56] References Cited

U.S. PATENT DOCUMENTS

| 4,362,339 | 12/1982 | Belart | 303/117.1 |
| 4,941,712 | 7/1990 | Hirobe | 303/900 X |
| 5,114,216 | 5/1992 | Tsuda et al. | 303/117.1 |
| 5,221,129 | 6/1993 | Takasaki | 303/117.1 X |

FOREIGN PATENT DOCUMENTS

| 0202845A2 | 5/1986 | European Pat. Off. . |
| 0507492A1 | 10/1992 | European Pat. Off. . |
| 3148979A1 | 10/1982 | Fed. Rep. of Germany . |
| 2194010A | 2/1988 | United Kingdom . |
| 2201208A | 8/1988 | United Kingdom . |

*Primary Examiner*—Robert J. Oberleitner
*Assistant Examiner*—Alfred Muratori
*Attorney, Agent, or Firm*—Biebel & French

[57] ABSTRACT

The present invention relates to a brake fluid pressure control apparatus in which a casing contains a pump communication port separately from a master cylinder communication port. A spool is also provided which limits the communication between the pump communication port and the master cylinder communication port in a manner such that the discharge pressure from the pump is not added directly to the master cylinder. Additionally, in the intake and discharge sides of the pump, a bypass channel is provided. In this bypass channel, a relief valve is provided which allows the escape of pressure force to the intake side of the pump in the case when the pressure force between the discharge side of the pump and the flow control increases to a high pressure. Furthermore, because the brake fluid is normally designed to be discharged from the pump to the flow control valve at approximately a fixed flow rate by means of the relief valve, there is no return of brake fluid to the master cylinder via the flow control valve, and stroke fluctuations of the master cylinder can be eliminated. Additionally, the necessity for providing an orifice between a pump communication port and the master cylinder communication port disappears.

5 Claims, 11 Drawing Sheets

BRAKE FLUID PRESSURE CONTROL APPARATUS

RELATED APPLICATION

This is a division of application Ser. No. 07/904,988, filed Jun. 26, 1992, now pending.

BACKGROUND OF THE INVENTION

The present invention relates to a brake fluid pressure adjustment apparatus possessing antiskid control action for use in brake apparatuses of vehicles, which prevents locking of vehicle wheels during braking.

Prior Art

FIG. 12 shows a brake fluid pressure adjustment apparatus possessing antiskid control action for use in brake apparatuses of vehicles, which prevents locking of the wheels during braking (Japanese Patent Application First Publication No. Hei 1-297350; U.S. Pat. No. 4,988,148). This brake fluid pressure control apparatus 261 employs a flow control valve possessing a casing 258 and a spool 259. In casing 258, a master cylinder communication port 251, a wheel cylinder communication port 253, and a reservoir communication port 257 are provided. Master cylinder communication port 251 is communicated to a master cylinder 250, wheel cylinder communication port 253 is communicated to a wheel cylinder 252, and reservoir communication port 257 is communicated to the intake side of pump 256 and reservoir 255 via first valve 254. Furthermore, pump 256 takes in and discharges brake fluid inside of the reservoir 255. Spool 259 is provided in a manner such that it is movable within casing 258.

Spool 259 of flow control valve 260 communicates master cylinder communication port 251 and wheel cylinder communication port 253 during non-action of antiskid control. Additionally, spool 259 moves by means of the difference in pressure created due to the opening of first valve 254 at the time of pressure reduction during antiskid control, and limits the communication of master cylinder communication port 251 and wheel cylinder communication port 253, while at the same time connecting wheel cylinder communication port 253 and reservoir 257. At the same time, spool 259 supplies to wheel cylinder 252 brake fluid which is returned by means of pump 256, through the closing of the aforementioned first valve 254 during repressurization.

Brake fluid pressure adjustment apparatus 261 is constructed in a manner such that at the time of repressurization of brake fluid pressure during antiskid action, the pulsating motion generated by pump 256 and the stroke fluctuations (so-called "kick-back") created in master cylinder 250 are both prevented. That is, the brake fluid discharged by pump 256, with no relation to master cylinder 250, passes via flow control valve 260 at a fixed flow amount, flowing out towards wheel cylinder 252. As a result, casing 258 possesses, individually, pump communication port 262 connecting to the discharge side of pump 256. Additionally, during antiskid control, spool 259 limits the communication between pump communication port 262 and master cylinder communication port 251. Together with this, a channel 263, separate from flow control valve 260, is provided between master cylinder communication port 251 and pump communication port 262 in a manner so that brake fluid is returned at a fixed flow amount from pump 256 to master cylinder 250; in this channel 263, an orifice 264 is provided. However, in the above-mentioned construction of brake fluid pressure adjustment apparatus 261, when the aforementioned orifice 264 between master cylinder communication port 251 and pump communication port 262 is large, a large pump pulsation is imparted to master cylinder 250. Additionally, when orifice 264 is too small, there exist problems during manufacturing, such as increased processing costs, as well as problems such as gum, mixed into the brake fluid, becoming clogged at orifice 264. Furthermore, orifice 264 varies the flow amount of brake fluid returned to master cylinder 250 due to fluctuation in the discharge pressure of pump 256. As a result, a stroke fluctuation is created by master cylinder 250. Therefore, in regard to the above points, improvements have become necessary.

SUMMARY OF THE INVENTION

The purpose of the present invention is to provide a brake fluid pressure adjustment apparatus which can, by means of elimination of the orifice provided between the master cylinder communication port and pump communication port, be manufactured at a low cost, without the occurrence of clogging of gum and the like, as well as in reality stop stroke fluctuations of the master cylinder.

In order to achieve the above objectives, the present invention, in order to carry out antiskid control of the vehicle, supplies a brake fluid pressure control apparatus to be provided on a brake fluid pressure control circuit for antiskid control of wheeled vehicles, the brake fluid pressure control circuit including a brake pedal for initiating braking of the wheels, a master cylinder for providing brake fluid pressure to the circuit, and wheel cylinders for providing brake fluid pressure to brakes of the wheels, the brake fluid pressure control apparatus comprising:

a first valve which opens when brake fluid pressure decreases, and closes when brake fluid pressure increases;

a reservoir for receiving brake fluid;

a pump having an intake side for taking in brake fluid from the reservoir, and an outlet side for discharging brake fluid;

a flow control valve communicating with the master cylinder, the wheel cylinder, the reservoir, and the pump, this flow control valve controlling the fluid flow so that the fluid pressure of the wheel cylinder undergoes pressure decrease and pressure increase; the flow control valve comprising:

a casing comprising:

a master cylinder communication port communicating to the master cylinder;

a wheel cylinder communication port communicating to the wheel cylinder;

a reservoir communication port communicating with the intake side of the pump and the reservoir via the first valve; and a pump communication port which connects to the discharge side of said pump;

a spool, provided as a movable element inside of the casing;

a spring which provides force to the spool in one direction;

wherein the spool, in a motionless state in which force is provided in one direction by the spring, connects the master cylinder communication port and the wheel cylinder communication port;

and during brake fluid pressure decrease, moves by means of a difference in pressure generated on both sides by means of the opening of the first valve restricts the communication between the master cylinder communication port and the wheel cylinder communication port, connects the wheel cylinder communication port and the reservoir communication port, and restricts the communication between the pump communication port and the master cylinder communication port;

the spool which, during brake fluid pressure decrease, when the first valve is in the open state, supplies brake fluid discharged from the pump from the pump communication port to the reservoir communication port via the interior orifice at roughly a fixed flow amount;

and the spool, during brake fluid pressure increase, when the first valve returns to a closed condition, supplies brake fluid discharged from the pump from the pump communication port to the wheel cylinder communication port at roughly a fixed flow amount via interior orifice provided on the interior portion;

first bypass channel which joins the intake side and discharge the of said pump in a bypass manner; and a relief valve provided in this first bypass channel, which, in the case when brake fluid pressure between the discharge side of the pump and the flow control valve exceeds a predetermined pressure, controls the flow amount of brake fluid to the flow control valve by means of allowing surplus brake fluid pressure to escape to the intake side of said pump; whereby controlling the brake fluid pressure so as to prevent slippage of the wheels during braking.

With the construction of the present invention, the pump communication port is individually communicated to the pump. Thus, during movement of the spool, the pressure discharge from the pump is not added directly to the master cylinder due to this spool. That is, the communication of the pump communication port and the master cylinder communication port is restricted. In this manner, when the communication of the master cylinder and the pump is in a restricted state, the following actions occur.

When the brake fluid is discharged from the pump from the flow control valve, the relief valve provided on the bypass channel which bypasses the intake and discharge sides of the pump allows for the release of surplus pressure to the intake side of the pump, in the case when the pressure between the discharge side of the pump and the pump communication port exceeds a predetermined pressure.

As a result, it is arranged so that, brake fluid is always discharged at an approximately fixed flow amount from the pump to the pump communication port. The entire amount of this brake fluid passes through the flow control valve; for example, this brake fluid is supplied at a fixed flow amount towards the wheel cylinder, and thus the return of brake fluid to the master cylinder does not occur. Furthermore, communication of the master cylinder communication port and the pump communication port, via the orifice provided on a separate channel from the flow control valve, becomes unnecessary.

Consequently, by means of the brake fluid flowing through the flow control valve from the pump at approximately a fixed flow amount, return of the brake fluid to the master cylinder does not occur, and elimination of the stroke fluctuations of the master cylinder is possible. Additionally, there is no need for a reciprocal communication between the master cylinder communication port and the pump communication port via an orifice provided on a separate channel from the flow control valve, and thus, the situation in which the gum mixed into the brake fluid clogs at the orifice is not created, and the reliability is thereby increased. Furthermore, in the pump, there is no action of a pressure burden over a fixed value, and due to this, fluctuations in the sound of the pump and in the sound of the motor driving the pump disappear, and thus discordant sounds from action can no longer be perceived by the ear. Together with this, because there is no longer a necessity of creating excessively large pressure above the open valve pressure of the relief valve in the pump, a minimum necessary limit for the driving force of the motor driving the pump is set, and the weight and cost of the motor is thus decreased.

PREFERRED EMBODIMENTS OF THE PRESENT INVENTION

Figure 1:
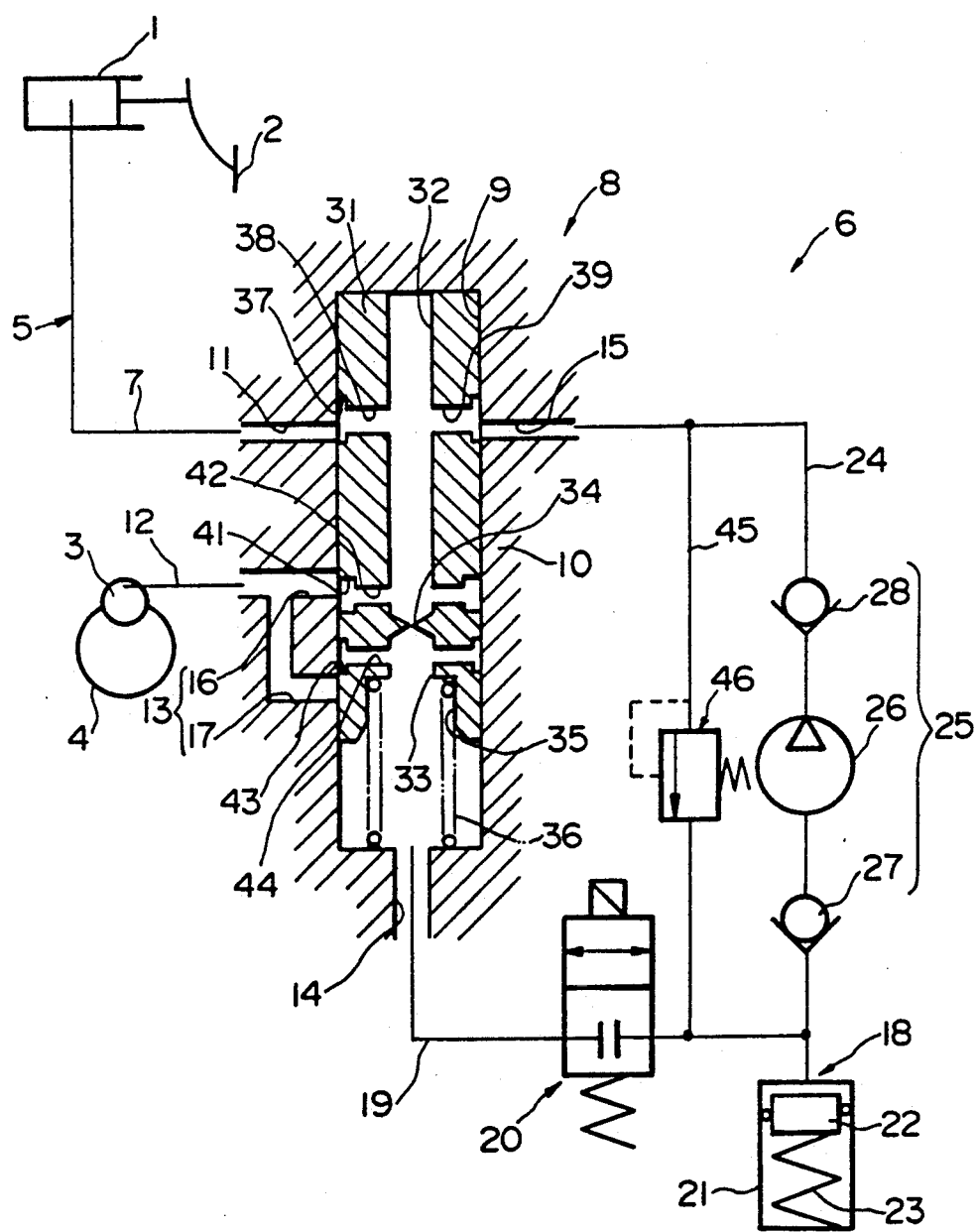
FIG. 1 schematically shows an outline of the construction of a brake fluid pressure adjustment apparatus according to a first preferred embodiment.

In the following, a description of the brake fluid pressure adjustment apparatus according to the first preferred embodiment of the present invention will be given with reference to FIG. 1. Furthermore, upper/- lower parts of the figure have been abbreviated for convenience as "upper/lower" in the following description.

In the figure, master cylinder 1 is communicated to brake pedal 2, and in response to the pressing of this brake pedal 2, brake fluid pressure is generated. Wheel cylinder 3 brakes the wheel 4 of the vehicle by means of brake fluid pressure. A brake fluid pressure control circuit 5 is also provided which is communicated between master cylinder 1 and wheel cylinder 3; in this brake fluid pressure control circuit 5, a brake fluid pressure control apparatus 6 is provided. This brake fluid pressure control apparatus 6 carries out antiskid control, that is, this brake fluid pressure control apparatus 6 lowers and raises the pressure of the brake fluid passing from master cylinder 1 to wheel cylinder 3 in response to the slip tendency of the vehicle wheel 4.

A flow control valve 8 is provided in a channel 7, within brake fluid pressure control circuit 5, which communicates to master cylinder 5. This flow control valve 8 houses casing 10. This casing 10 has a cylindrically shaped cylinder portion 9 which extends in an up/down direction; a plurality of ports are provided on this cylinder portion 9.

These aforementioned ports include master cylinder communication port 11, wheel cylinder communication port 13, reservoir communication port 14, and pump communication port 15.

Master cylinder communication port 11 lies orthogonal to the axis of cylinder portion 9, and is provided at a predetermined position, connecting to master cylinder 1 via channel 7.

Wheel cylinder communication port 13 is provided below the predetermined distance of master cylinder communication port 11, and communicates to wheel cylinder 3 via channel 12 of brake fluid pressure control circuit 5.

Reservoir communication port 14 is provided in a predetermined position at the lower portion of cylinder portion 9, along the direction of the axis of cylinder portion 9.

Pump communication port 15 is provided opposite master cylinder communication port 11 along the same axis.

Furthermore, the aforementioned wheel cylinder communication port 13 is formed from upper portion port 16 and lower portion port 17. Upper portion port 16 is provided parallel to master cylinder communication port 11 at a distance less than the predetermined distance of master cylinder communication port 11. The lower portion port 17 communicates and lies parallel to upper portion port 16 on the outside of cylinder portion 9, and is provided in at a distance less than the predetermined distance of upper portion port 16.

Reservoir communication port 14 of flow control valve 8 communicates to the variable capacity reservoir 18 via channel 19 of brake fluid pressure control circuit 5, and an electromagnetic first valve 20 is provided along channel 19 between flow control valve 8 and reservoir 18.

Furthermore, the aforementioned reservoir 18, in order to achieve this variable capacity function, includes a reservoir cylinder 21, a reservoir piston 22 which is housed inside reservoir cylinder 21 as a slidable element, and a reservoir spring 23 which urges reservoir piston 22 at a predetermined force. Additionally, pump communication port 15 of flow control valve 8 is communication to reservoir 18 via channel 24 of brake fluid pressure control circuit 5.

Along this channel 24, between flow control valve 8 and reservoir 18, pump 25 is provided. This pump 25 is comprised of pump main body 26, intake valve 27, and discharge valve 28. Pump main body 26 carries out intake and discharge functions by means of a driving motor. Intake valve 27, provided between pump main body 26 and reservoir 18, allows for only the flow of brake fluid from reservoir 18 to pump main body 26. Discharge valve 28, provided between pump main body 26 and pump communication port 15, allows for only the flow of brake fluid from pump main body 26 to pump communication port 15. This pump 25 is designed chiefly to intake brake fluid inside of reservoir 18 and discharge this brake fluid to pump communication port 15 of flow control valve 8.

Furthermore, inside of casing 10 of flow control valve 8, a solid cylindrically shaped spool 31 is inserted in a manner such that it can move upwardly and downwardly. This spool 31 includes upper portion aperture 32, lower portion aperture 33, and interior orifice 34. The upper portion aperture 32 is drilled centrally along the direction of the axle at a predetermined diameter, from the upper end portion of spool 31 to the nearly center position which is predetermined. The lower portion aperture 33 is formed at the same diameter as that of the axle and the upper portion 32, from the lower end portion of spool 31 to the nearly center position which is predetermined, and normally communicates to reservoir communication port 14. Upper portion aperture 32 and lower portion aperture 33 are communicated to each other at interior orifice 34 which has a predetermined diameter which is smaller than either of the aforementioned apertures. Furthermore, at the lower end, an opening portion 35 of lower portion aperture 33 is designed at a predetermined value greater than the diameter of the other portions. The upper portion of spring 36 is inserted into this opening portion 35. Spring 36 provides a predetermined force to spool 31 in the upward direction.

When antiskid control is not being carried out, spool 31, by means of the force provided by spring 36, has its upper portion in contact with the upper portion of cylinder portion 9, and enters a motionless state (the state shown in FIG. 1). In contrast, when electromagnetic first valve 20 opens, a difference in pressure from both sides is created in interior orifice 34 by means of brake fluid inside of lower portion aperture 33 flowing to reservoir 18. By means of this difference in pressure, spool 31 moves downwards. This spring 36 is the spring described in Claim 1.

Spool 31 includes first groove portion 37, first aperture 38, second aperture 39, second groove portion 41, third aperture 42, third groove portion 43, and fourth aperture 44.

First groove portion 37 is provided at the outer periphery of spool 31 below a predetermined distance from the upper end, extending around the entire circumference, and possessing a predetermined width. First aperture 38 communicates first groove portion 37 and upper portion aperture 32. Second aperture 39 communicates first groove portion 37 and upper portion aperture 32. When spool 31 is in a motionless state, first groove portion 37 communicates master cylinder communication port 11 and pump communication port 15. During this time, master cylinder communication port 11 and pump communication port 15 are communicated directly by means of first groove portion 37, and are communicated via first aperture 38, upper portion aperture 32, and second aperture 39.

Second groove portion 41 is provided at the periphery at a predetermined distance from first groove portion 37, extending over the entire circumference, and having a predetermined width. Third aperture 42 communicates second groove portion 41 and upper portion aperture 32. When spool 31 is in a motionless state, upper portion aperture 32 and upper portion port 16 are communicated by means of second groove portion 41 and third aperture 42; in contrast, when spool 31 is in a state of motion, the communication of upper portion aperture 32 and upper portion port 16 is cut off.

Third groove portion 43 is provided at the outer periphery of spool 31 at a predetermined distance from second groove portion 41, extending over the entire circumference, and possessing a predetermined width. Fourth aperture 44 communicates third groove portion 43 and lower portion aperture 33. When spool 31 is in a motionless state, the communication of lower portion aperture 33 and lower portion part 17 is cut off by means of third groove portion 43 and fourth aperture 44; in contrast, when spool 31 is a state of motion, lower portion aperture 33 and lower portion port 17 are communicated by means of third groove portion 43 and fourth aperture 44.

For the sake of convenience, first aperture 38 and second aperture 39 have been described separately; however, because first groove 37 is provided in spool 31, they may be considered as one aperture.

The portion between pump communication port 15 and discharge valve 28 on channel 24 and the portion between electromagnetic first valve 20 and intake valve 27 on channel 19 are joined by first bypass channel 45. Along this first bypass channel 45, a relief valve 46 is provided. This relief valve 46 is designed to open when the brake fluid pressure between discharge valve 28 and pump communication port 15 exceeds a predetermined value. When this relief valve 46 opens, the surplus brake fluid pressure escapes to the intake side of pump 25 from channel 24.

In the following, an explanation will be given in regard to the action of brake fluid pressure control apparatus 1 according to the first embodiment of the present invention.

To begin with, when antiskid control is in a nonactive state, spool 31 of flow control valve 8, as shown in FIG. 1, communicates master cylinder 1 and wheel cylinder 3 via master cylinder communication port 11, first portion groove 37, first aperture 38, upper portion aperture 32, third aperture 42, second groove portion 41, and upper portion port 16. As a result, pressure is added to wheel cylinder 3 in response to the pressing of brake pedal 2. When this occurs, the communication of fourth aperture 44 and third groove portion 43 with all of the ports is designed to be cut off. Additionally, when brake pedal 2 is pressed, the brake fluid pressure generated by master cylinder 1 is delivered to the discharge side of pump 25 as well as relief valve 46 via pump communication port 15 of flow control valve 8. However, the discharge valve 28 is provided in pump 25, and additionally, the open valve pressure of relief valve 46 set at a predetermined high pressure than the brake fluid pressure generated by master cylinder 1. As a result, there is no delivery of brake fluid pressure to pump main body 26 via the aforementioned communications.

Instructions are sent out from a control apparatus (not shown in the figures) when a decision is made that the vehicle wheels have entered a locked tendency by means of information from a vehicle wheel speed sensor (also not shown in the figures). By means of these instructions, brake fluid pressure control apparatus 6 carries out the pressure-lowering action of antiskid control. That is, the brake fluid pressure between master cylinder 1 and wheel cylinder 3 is lowered. When this occurs, the brake fluid inside the portion enclosed by lower portion aperture 33 and cylinder portion 9, by means of opening of electromagnetic first valve 20, flows to reservoir 18, and as a result, a difference in pressure is generated on both sides of interior orifice 34 of spool 31. By means of this difference in pressure, spool 31 opposes the force of spring 36, and moves in a downward direction as seen in FIG. 1, cutting off the communication of second groove portion 41 and upper portion port 16 together with restricting the communication of master cylinder communication port 11 and upper portion port 16 (i.e., reducing it to a minute communication, or cutting it off completely). At the same time, spool 31 communicates wheel cylinder 3 and reservoir 18 via lower portion port 17, third groove portion 43, fourth aperture 44, lower aperture 33, and reservoir communication port 14. As a result, the brake fluid inside of wheel cylinder 3 flows into reservoir 18, and thus the brake fluid pressure of wheel cylinder 3 is reduced.

When this occurs, brake fluid is taken in from reservoir 18 and then discharged to pump communication port 15 by means of the driving force of pump 25. This brake fluid flows from pump communication port 15, passing through the interior of flow control valve 8, and flowing to reservoir 18. Furthermore, when in this condition, the communication of master cylinder communication port 11 and pump communication port 15 is restricted by spool 31. As a result, the pressure discharged from pump 25 is not directly added to master cylinder 1. Furthermore, at the time of readdition of pressure during antiskid control, brake fluid flowing from flow control valve 8 to reservoir 18 is stopped by the closing of electromagnetic first valve 20, and spool 31 moves slightly in the up/down direction of FIG. 1, by means of the pressure inside of lower portion aperture 33. As a result, spool 31 supplies the brake fluid which until this time has been circulated by pump 25, from flow control valve 8 to wheel cylinder 3 via upper portion aperture 32, interior orifice 34, and fourth aperture 44. The amount of brake fluid flowing to wheel cylinder 3 is more or less a fixed flow amount depending on the amount in the communication of first aperture 38 and master cylinder communication port 11 and the amount in the communication of second aperture 39 and pump communication port 15.

Similarly, during antiskid control, when the pressure in channel 24 between pump 25 and flow control valve 8 exceeds a predetermined pressure, relief valve 46 provided in first bypass channel 45 allows the escape of surplus pressure in channel 24 to the intake side of pump 25 via first bypass channel 45. In this way, brake fluid at a fixed pressure is normally discharged from pump 25 towards pump communication port 15. This brake fluid, passing through the interior of flow control valve 8, is supplied to wheel cylinder 3 or reservoir 18 in a fixed flow amount. Consequently, because the amount of brake fluid returning to master cylinder 1 is decreased, stroke fluctuations of master cylinder 1 can be reduced.

Moreover, due to the release of surplus pressure by relief valve 46, there is no action in pump 25 for a pressure burden over a fixed value, and as a result, the rotation of pump 25 and the motor which drives the pump (not shown in the figures) can be maintained at a fixed rate. In this way, sounds which are discordant to the ear are not produced because fluctuations generating sounds as a result of usage of pump 25, as well as the motor which drives the pump, are phased out. Together with this, the driving force of the motor driving pump can be set at a minimum necessary limit since the necessity of creating excessively large pressure from open valve pressure of relief valve 46 is abolished. Due to the above, the cost as well as the weight of the motor are likewise reduced.

Furthermore, it is no longer necessary for the orifice, provided on a channel separate from flow control valve 8, to connect master cylinder communication port 11 and pump communication port 15; thus, unfavorable situations in which the orifice acts as the source, do not occur (for example, when gum mixed into the brake fluid is clogged at the orifice) and thus dependability can be improved.

Furthermore, it is desirable to set the open valve pressure of relief valve 46 to the maximum brake fluid pressure of the vehicle.

In the following, a brake fluid pressure adjustment apparatus according to the second embodiment of the present invention will be explained with reference to FIGS. 2 and 3. Furthermore, the chief difference between the second embodiment in comparison to the first embodiment lies in the relief valve, thus the explanation will center around the parts which are different: corresponding sections to the apparatus of the first embodiment will be denoted by identical numbers; however, these explanations will be omitted.

The aforementioned brake fluid pressure adjustment apparatus 6 of the first embodiment is a fixed value set to the maximum brake fluid pressure of the vehicle which corresponds to the open valve pressure of relief valve 46. However, in the aforementioned construction, when the pressure of master cylinder 1 is low, there is the possibility that a quantity of brake fluid will return to master cylinder 1. Therefore, the brake fluid pressure control apparatus of the second preferred embodiment further improves the aforementioned point.

Figure 2:
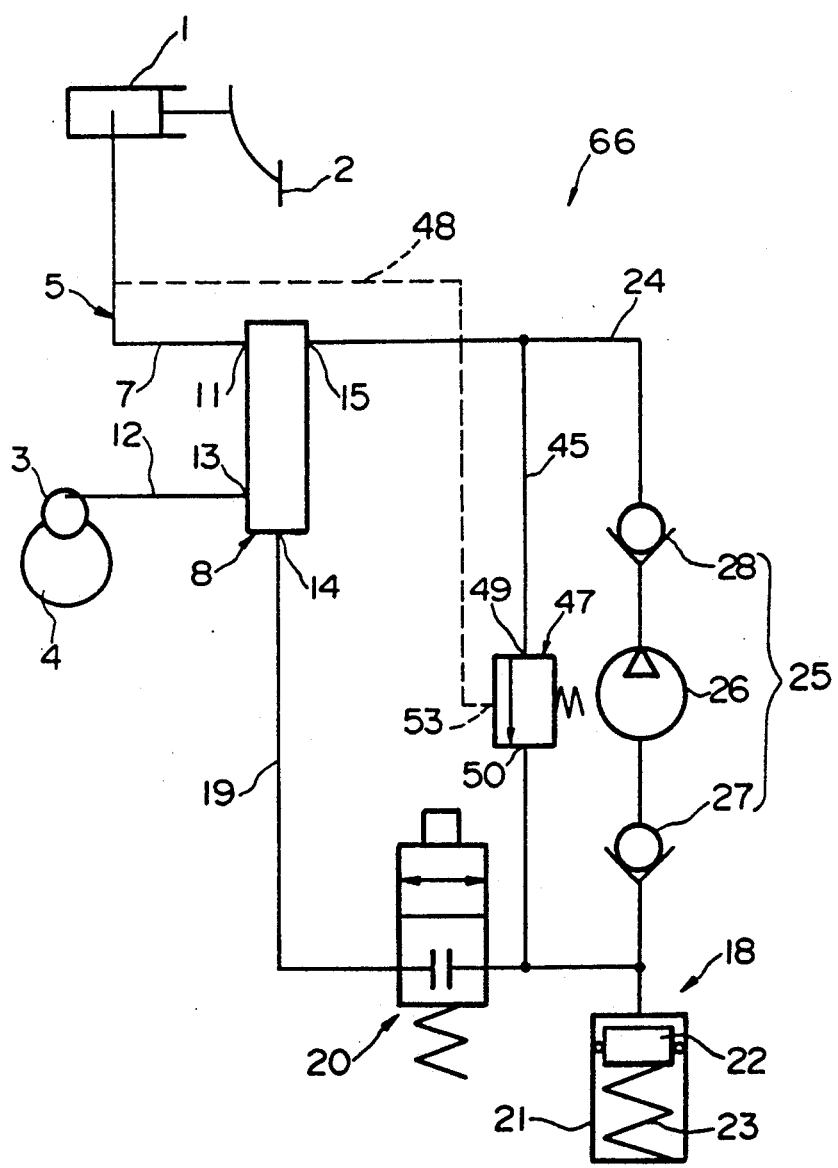
FIG. 2 schematically shows an outline of the construction of a brake fluid pressure adjustment apparatus according to a second preferred embodiment.

To relief valve 47 of brake fluid pressure control apparatus 66 according to the second embodiment, a branching channel 48 is communicated from channel 7 between master cylinder 1 and flow control valve 8, as shown in FIG. 2. This relief valve 47, as shown in FIG. 3, includes pump communication chamber 51 and master cylinder communication chamber 52. Pump communication chamber 51 includes induction port 49, connecting to the discharge side of pump 25, and discharge port 50. Master cylinder communication chamber 52 is provided separately from pump communication chamber 51, and in master cylinder communication chamber 52, communication port 53 is provided connecting to channel 48.

In the interior of pump communication chamber 51, valve element 55 is provided. When this valve element 55 is seated onto seat portion 54, formed at the boundary portion of induction port 49 and the inner side of pump communication chamber 51, this seat portion 54 is closed up. However, when valve element 55 moves toward the left in FIG. 3, by means of brake fluid pressure introduced from induction port 49, the valve opens, and it becomes possible for brake fluid to flow to discharge port 50. This valve element 55 houses, the tip portion 57, on the induction port 49 side, of valve element spring 56, which provides force to the aforementioned valve element 55 in the direction corresponding to the right in FIG. 3.

Figure 3:
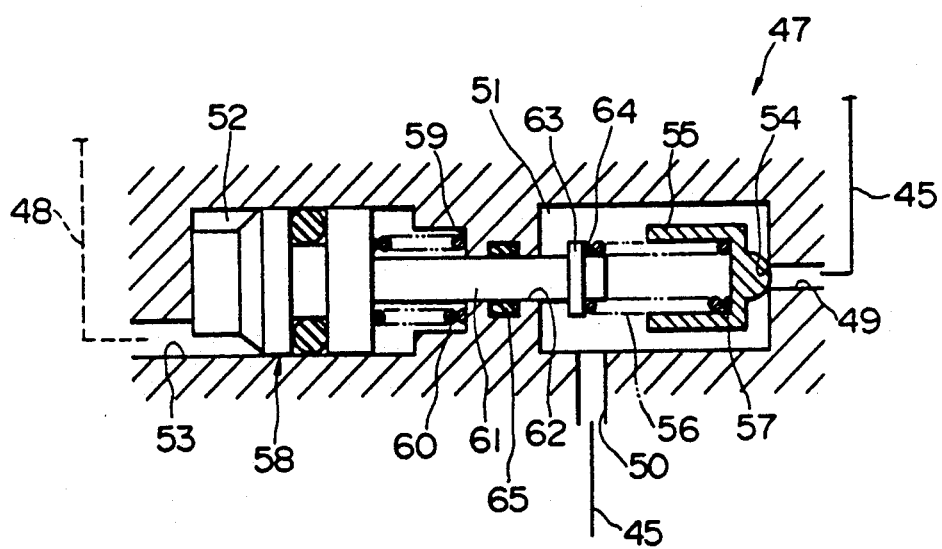
FIG. 3 is a cross sectional view showing a relief valve of a brake fluid pressure adjustment apparatus according to a second preferred embodiment.

Additionally, a piston 58 which is movable in the left/right directions of FIG. 3 is housed inside of master cylinder communication chamber 52. This piston 58 can be urged toward the left in FIG. 3 by means of piston spring 60 which is provided in between piston 58 and the end 59 of master cylinder communication chamber 52 closest to pump communication chamber 51. An axle portion 61 of piston 58 is inserted into communication aperture 62 which is provided in between pump communication chamber 51 and master cylinder communication chamber 52. The other end 64 of the aforementioned valve element spring 56 inside of pump communication chamber 51 is seated on end portion 63 of axle portion 61. Seal member 65, which seals communication aperture 62 when piston 58 is in the inserted condition, is provided in between master cylinder communication chamber 52 and pump communication chamber 51. Furthermore, inside of master cylinder communication chamber 52, the chamber in which piston spring 60 is provided communicates with the atmosphere. The aforementioned valve element 55 and piston 58 comprise the valve members, while valve element spring 56 and piston spring 60 comprise the force members.

Furthermore, the spring constants of valve element spring 56 and piston spring 60 are set in a manner such that the discharge pressure of pump 25 increases a given amount greater than the brake fluid pressure generated by master cylinder 1.

In this type of relief valve 47 construction, when the brake fluid pressure generated in channel 7 between master cylinder 1 and flow control valve 8 flowing from channel 48 to relief valve 47, becomes large, piston 58 opposes the force of piston spring 60, and moves a predetermined distance in response to the amount of brake fluid pressure. Thus, this construction of relief valve 47 reduces valve element spring 56 and increases the predetermined amount of valve opening pressure for valve element 55.

By controlling the opening valve pressure of relief valve 47 of brake fluid pressure control apparatus 66 in the above manner, the discharge pressure of pump 25 introduced in flow control valve 8 will correspond to the brake fluid pressure generated by master cylinder 1. As a result, in comparison to brake fluid pressure control apparatus 6 of the first embodiment, the pressure burden on pump 25 and the motor which drives pump 25 can be further reduced; similarly, the amount of brake fluid returning to master cylinder 1 can also be further reduced. Furthermore, the brake fluid of master cylinder 1 generated by the pressing of brake pedal 2 is designed to be delivered to the discharge side of pump 25 and relief valve 47 via pump communication port 15 of flow control valve 8. However, a discharge valve 28 is provided in pump 25, and relief valve 47 is designed so that the open valve pressure as stated above reaches a fixed high pressure from the brake fluid pressure of master cylinder 1. As a result, there is no delivery of brake fluid pressure to pump main body 26 and master cylinder 1 via discharge valve 28 and relief valve 47.

In the following, a brake fluid pressure control apparatus according to the third embodiment of the present invention will be explained with reference to FIG. 4.

Furthermore, the main difference in the third embodiment with respect to the first embodiment and the second embodiment lies principally within the relief valve, thus the following explanation will revolve around the portions which are different; those parts which are similar to the apparatus of the first and second embodiments will be denoted using identical numbers, and these explanations will be omitted.

During antiskid control action of relief valves 46 and 47 of brake fluid pressure apparatuses 6 and 66, according to the above first and second preferred embodiments, when brake pedal 2 returns, brake fluid remains inside reservoir 18; however, there is a possibility that this brake fluid will hinder the control qualities during the next antiskid control action. Therefore, brake fluid pressure control apparatus 67 according to the third embodiment prevents brake fluid from remaining inside reservoir 18 (without using pump 25), so that the control ability is unhindered in subsequent antiskid control action.

Furthermore, master cylinder 30 according to the third preferred embodiment is a tandem master cylinder, delivering brake fluid pressure through two brake fluid pressure control circuit systems 5A and 5B; both circuit systems are constructed identically; thus only one circuit system 5A is shown in the diagram.

Relief valve 68 according to the third embodiment has a generally cylindrical shaped housing 69 within which control port 70, discharge port 71, and induction port 72 are provided. Control port 70 is provided at a predetermined position orthogonal to the axial direction of housing 69. Discharge port 71 is parallel to control port 70 and is provided below a predetermined distance. Induction port 72 is provided along the axial direction of the lower portion center of housing 69. The aforementioned control port 70 is communicated to channel 7 between master cylinder 1 and flow control valve 8 through branched channel 48. Induction port 72 is joined to the communication point of channel 24 of first bypass channel 45. Discharge port 71 is joined to the communication point of channel 19 of first bypass channel 45. Additionally, inside the peripheral portion at the upper end of housing 69, an internal thread portion 73 is formed.

Figure 4:
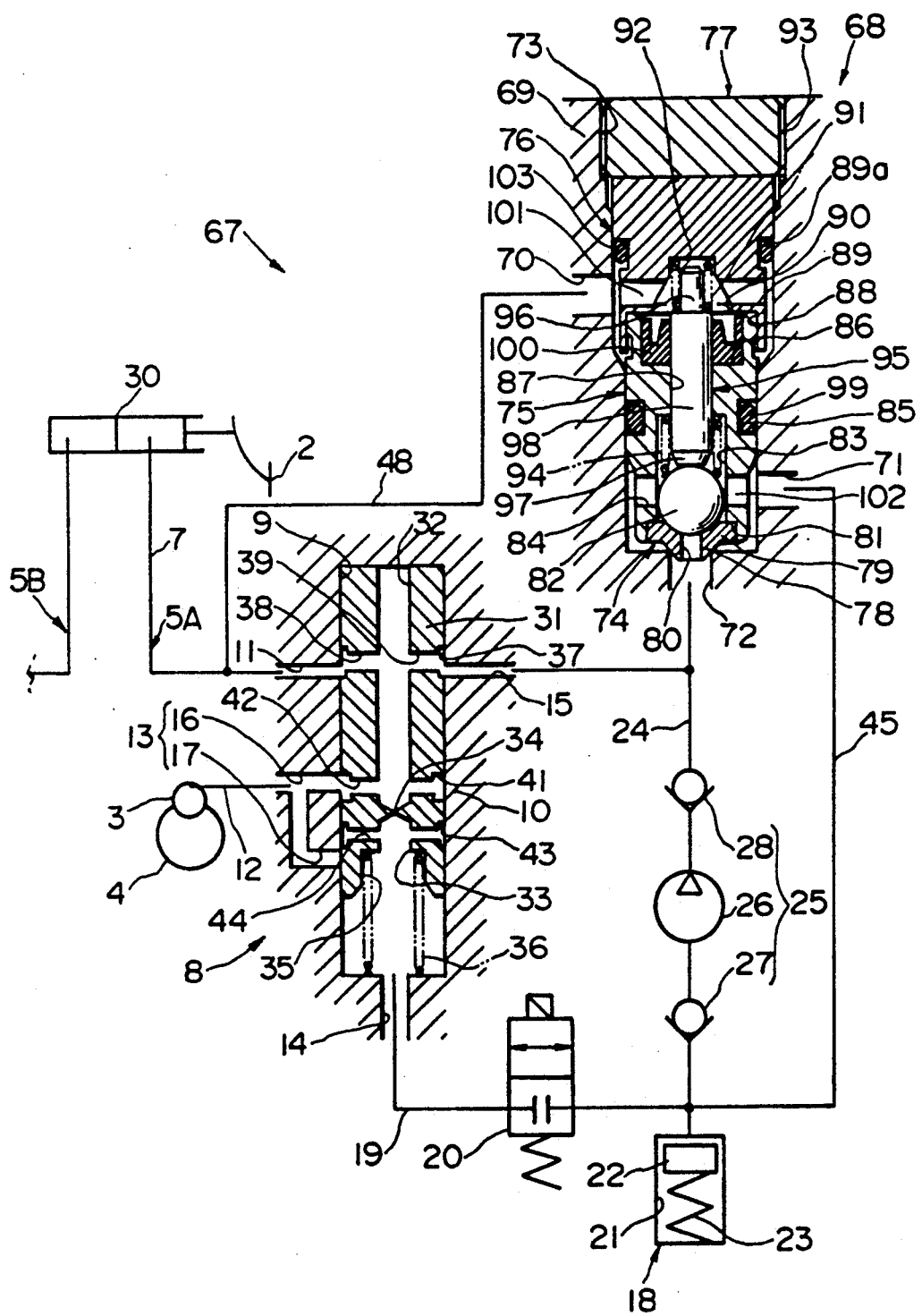
FIG. 4 schematically shows an outline of the construction of a brake fluid pressure adjustment apparatus according to a third preferred embodiment.

Inside of housing 69, the following are provided, in order, from the bottom to the top in FIG. 4: first member 74, second member 75, third member 76, and fourth member 77.

First member 74 includes taper portion 78 and flange 79. Tapered portion 78 is formed tapering towards the end which sets into induction port 72. Flange 79 is provided above tapered portion 78, and forms a circular plate. In the center of first member 74, a bore 80 is provided which bores along the axial direction (comprising a portion of induction port 72).

Second member 75 includes concave portion 81, valve element insert hole 83, discharge aperture 84, seal groove 85, cup packing groove 86, and communication aperture 87. Concave portion 81 is provided at the lower end of second member 75, and together with this, engages flange 79 of first member 74.

Valve element insert hole 83, running along the axial direction of the center of second member 75, is opened a predetermined depth from the bottom, and houses valve element 82, which will be explained hereinafter in a manner so that valve 82 is movable. Discharge aperture 84 is provided at a position approximately equal to the height of discharge port 71 of housing 69. Seal groove 85 is provided at a predetermined position on the outer periphery of second member 75. Cup packing groove 86 is provided at a predetermined diameter and a predetermined depth from the upper portion of second member 75 running along the axial direction. Communication aperture 87 communicates cup packing groove 86 and valve element insert hole 83 and thus is constructed having a predetermined diameter smaller than the aforementioned diameters.

Third members 76 include engagement convex portion 88, control aperture 89, bore 90, insert opening 92, and seal groove 89a. Engagement convex portion 88 is provided at the lower end of third member 76 along the axial direction, and engages the upper portion of the aforementioned second member 75. Control aperture 89 is provided at a position which is a predetermined distance above engagement convex portion 88 of third member 76, at a height approximately equal to that of control port 70. Bore 90 communicates control aperture 89 and engagement convex portion 88, and thus possesses a predetermined diameter. Insert opening 92 is provided having a predetermined depth above and orthogonal to control aperture 89. One end of piston spring 91 is inserted into this insert opening 92. Seal groove 89a is provided above control aperture 89 on the peripheral portion of third member 76.

At the periphery portion of fourth member 77, an external thread portion 93 is constructed which screws into internal thread portion 73 of housing 69. By means of external thread portion 93 screwing into internal thread portion 73, first member 74 is set onto induction port 72 of housing 69, and in this state, predetermined portions of first member 74, second member 75, third member 76, and fourth member 77, each respectively engage or come into contact (the configuration shown in FIG. 4).

Additionally, in valve element insert hole 83 of second member 75, in the engaged condition with first member 74, a valve element 82 formed from a globular shaped steel sphere is provided at the lower end. At the upper end of this valve element 82, a valve element spring 94 is provided which provides a predetermined force to valve element 82 in the direction to close off bore 80. Furthermore, the open valve pressure of this valve element 82 is greater than the pressure of master cylinder 1 introduced from channel 48 (that is, the pressure of master cylinder 1 added, along the axial direction, to insert portion 96 of piston 95 to be explained hereinafter) by only the predetermined force provided by piston spring 91 (to be explained hereinafter) and valve element spring 94.

In addition, a piston 95 is inserted into communication aperture 87 of second member 75 in a manner such that it is movable over a predetermined amount. Moreover, in between communication aperture 87 and piston 95, there is a space. This piston 95 comprises, from the bottom, in order: tip portion 97, axle portion 98, and insert portion.. 96. Tip portion 97 is formed so that it tapers toward the end. Insert portion 96 is inserted into one end of piston spring 91 (to be mentioned hereinafter). Piston spring 91 provides a predetermined force and is provided in between insert portion 96 of piston 95, and insert opening 92 of third member 76. It is designed so that by means of the force provided by piston spring 91, tip portion 97 of piston 95 first comes in contact with valve element 82, and then further urges valve element 92, urging it towards the direction of induction port 72. Additionally, a seal member 99 is provided in seal groove 85 of second member 75, which is supported in between seal groove 85 and housing 69.

In the air space formed by cup packing groove 86 and piston 95 of the second member 75, a cup packing 100 with an approximately U-shaped cross section with its curved side facing downward is inserted. This cup packing 100, in the case when fluid pressure of master cylinder communication chamber 101 is greater than the fluid pressure of pump communication chamber 102 (both to be described hereinafter), widens, cutting off the communication of master cylinder communication chamber 101 and pump communication chamber 102. In contrast, when the fluid pressure of master cylinder communication chamber 101 is lower than the fluid pressure of pump communication chamber 102, this cup packing 100 allows the flow of brake fluid from pump communication chamber 102 to master cylinder communication chamber 101 via communication aperture 87, in the state in which piston 95 is inserted.

Additionally, seal member 103 is provided in seal groove 89a of third member 76. This seal member 103 is supported between third member 76 and housing 69.

Furthermore, the above-mentioned discharge aperture 84 and valve element insert hole 83 principally comprise pump communication chamber 102 which communicates to pump 25 and is provided inside of housing 69. Control aperture 89 and cup packing groove 86 principally comprise master cylinder communication chamber 101 which communicates to master cylinder and is provided inside of housing 69. Valve element 82 and piston 95 comprise the valve member. Piston spring 91 and valve element spring 94 comprise the urging member. Channel 48, master cylinder communication chamber 101, communication aperture 87 and pump communication chamber 101 principally comprise the second bypass channel.

In the condition shown in FIG. 4, flow control valve 8 increases the pressure of wheel cylinder 3 in response to the pressing of brake pedal 2, during normal action.

Similarly, as in the first embodiment, when antiskid control action is entered, pump 25 enters a driving state and the brake fluid discharged from this pump 25 is controlled at a predetermined high level value greater than the brake fluid pressure generated by master cylinder 1 by means of relief valve 68, and is delivered to pump communication port 15 of flow control valve 8. That is, the pressure of master cylinder 1 is introduced to master cylinder communication chamber 101 from control port 70 of relief valve 68 via channel 48, and this pressure is designed to act on insert portion 96 of piston 95 along the axial direction. Consequently, the pressure from master cylinder 1, as well as force provided by piston spring 91, are designed to act on piston 95. The pressure from master cylinder 1, force provided by piston spring 91, as well as force provided by valve element spring 94, are all designed to act on valve element 82, which is set in contact with tip portion 97 of piston 95. When the brake fluid pressure discharged from pump 25 to act on valve element 82 rises above the combined force of the aforementioned pressure force from master cylinder 1, driving force from piston spring 91 and driving force from valve element spring 94, relief valve 68 opens induction port 72, allowing surplus pressure to escape to the intake side of pump 25 via discharge port 71 and first bypass channel 45. Consequently, the brake fluid pressure delivered to flow control valve 8 is controlled at a predetermined high pressure level greater than that from the pressure force from master cylinder 1 (combining the driving force provided by piston spring 91 and valve element spring 94). As a result, using a concrete example, when the pressure force from master cylinder 1 is at a comparatively low level, because the open valve of relief valve 68 is low, relief valve 68 opens easily, and brake fluid escapes to the intake side of pump 25. In contrast, when the pressure force of master cylinder 1 is high, because the open valve pressure of relief valve 68 is high, relief valve 68 does not open easily, and the brake fluid does not easily escape to the intake side of pump 25, in this manner, due to the approximately linear fluctuations of the open valve pressure of relief valve 68 in response to the pressure force of master cylinder 1, approximately a fixed flow amount of brake fluid can flow from pump 25 towards flow control valve 8. As a result, the brake fluid amount returning to master cylinder 1 becomes approximately fixed, and pedal kickback is reduced.

During antiskid control, in the condition when brake fluid is inside of reservoir 18, when the pressing of brake pedal 2 becomes weaker, and the pressure force of master cylinder 1 decreases, the pressure force of master cylinder communication chamber 101 of relief valve 68 decreases to a pressure force level less than that of pump communication port 102. In this way, cup packing 100 removes the shutting of communication aperture 87 in the state with piston 95 inserted therein. The brake fluid inside of reservoir 18 is designed to return to master cylinder 1 from reservoir 18 via first bypass channel 45, discharge port 71 of relief valve 68, pump communication chamber 102, communication aperture 87, master cylinder communication chamber 101, control port 70, and channel 48. As a result, return of the brake fluid inside reservoir 18 to master cylinder 1 can be accomplished without activating pump 25. Consequently, there is no transfer of harmful effects on control ability during subsequent antiskid control action. Additionally, because it is unnecessary to drive pump 25 during times other than antiskid control action, uncomfortable sensations (generated by the usage noise of pump 25) can be eliminated. Furthermore, in the aforementioned manner, valve member of relief valve 68 is not constructed from piston 95 and globular shaped valve element 82, but construction as a unitary body is possible. However, generally globular shaped steel spheres can be used as valves 82 requiring accuracy, by means of separate body construction, and as a result, manufacturing costs can be lowered. Additionally, it is of course possible to form a construction in which piston 95 and valve element 82 are urged, by means of piston spring 91 and valve element spring 94, as a single body, and not individually. However, by forming a construction which by which force is provided to these separately, because a smaller force can be applied when the aforementioned are separated rather than united, the construction can be made more compact. Additionally, because it becomes possible for piston 95 to be returned to its normal fixed position, unfavorable situations from failing of the brake pedal can be prevented.

In the following, the fourth embodiment of the present invention will be explained with reference to FIG. 5. Furthermore, in this fourth embodiment, the main difference in regard to the above third embodiment lies within relief valve; thus the following description will concentrate mainly on portions which are different; those portions which are the same as in the above third embodiment will be denoted by identical numbers and description thereof will be omitted. Additionally, as in the third embodiment, the brake fluid pressure control apparatus of the fourth embodiment contains two brake fluid pressure control circuit systems 5A and 5B which are of approximately the same construction; therefore, only one circuit system 5A is shown and explained; in regard to the other circuit system 5B, only portions requiring additional explanation are shown in the figure and explained.

Figure 5:
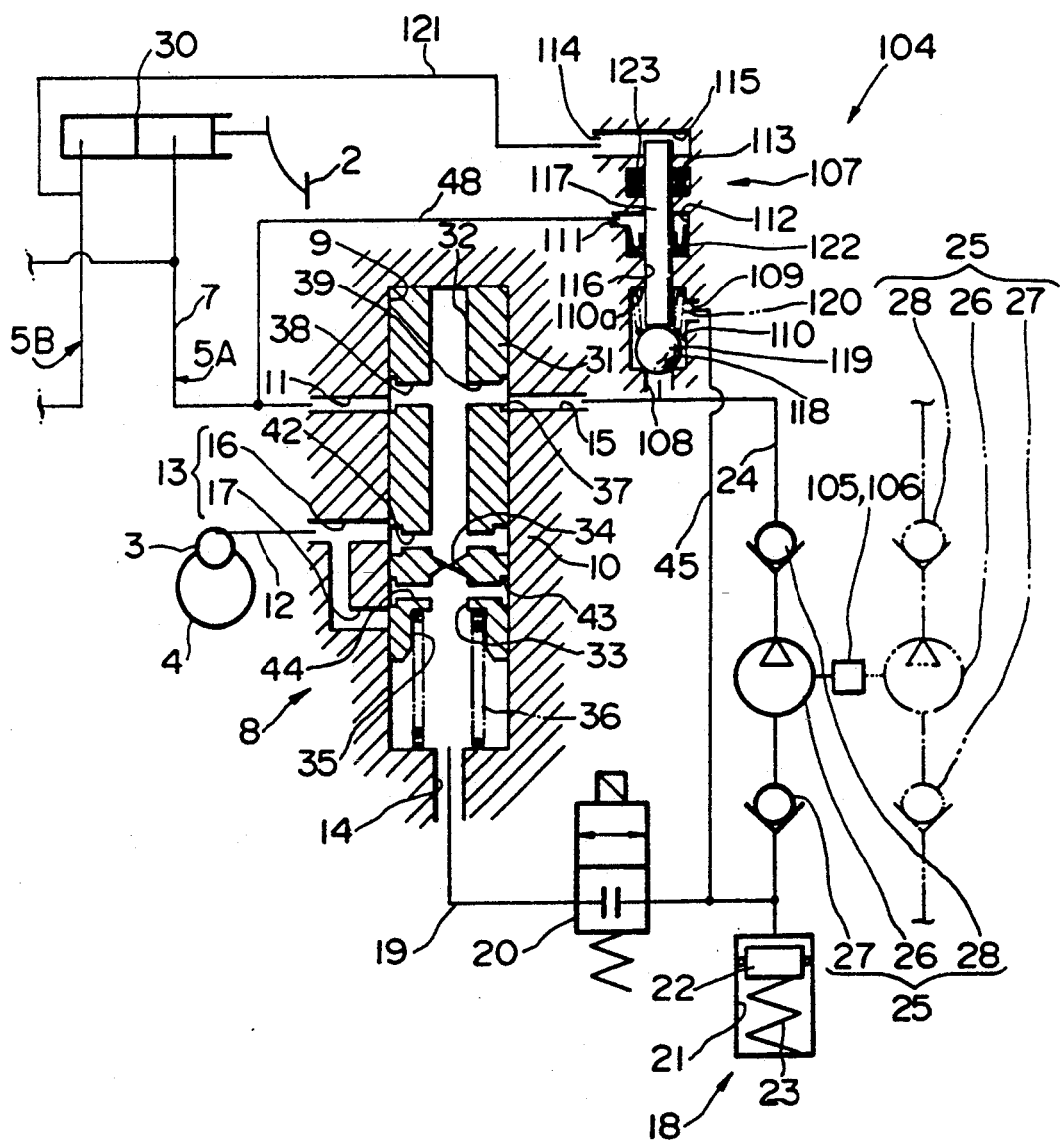
FIG. 5 schematically shows an outline of the construction of a brake fluid pressure adjustment apparatus according to a fourth preferred embodiment.

Pump main body 26 of pump 25 in brake fluid pressure control circuit system 5A according to the fourth embodiment, is designed to be driven together with pump main body 26 of pump 25 provided in the other circuit system 5B, by means of the same motor 105 and cam 106 (as shown by the dotted line in FIG. 5). It is designed so that when pump main body 26 of circuit system 5A takes in brake fluid, pump main body 26 of the other circuit system 5B discharges brake fluid; similarly, when pump main body 26 of circuit system 5A discharges brake fluid, pump main body of circuit system 5B takes in brake fluid. Similarly, in brake fluid pressure control apparatus 104 according to the fourth embodiment, a relief valve 107 is provided which allows escape of pressure force to the intake side of pump 25 in the case when the pressure force in between pump 25 and pump communication port 15 of first bypass channel 45 increases to a pressure greater than a predetermined pressure.

Relief valve 107, according to the fourth embodiment, includes pump communication chamber 110, master cylinder communication chamber 112, seal chamber 113, system communication chamber 115, and communication aperture 116. Pump communication chamber 110 includes induction port 108 which communicates to the discharging side of pump 25 and discharge port 109 which communicates to the intake side of pump 25. Master cylinder communication chamber 112 includes return port 111 which communicates to master cylinder 1 of system 5A. Master cylinder communication chamber 112 is provided in parallel above and separated from pump communication chamber 110. Seal chamber 113 is provided in parallel, above and separated from master cylinder communication chamber 112. System communication chamber 115 is provided in parallel, above and separated from seal chamber 113, and contains control port 114 which communicates to master cylinder 1 of system 5B. Communication aperture 116 penetrates through pump communication chamber 110, master cylinder communication chamber 112, seal chamber 113, and system communication chamber 115. In this communication aperture 116, a cylindrically shaped piston 117, which can move a predetermined amount upwards/downwards, is fittingly inserted.

A spherical valve element 119 is provided in the aforementioned pump communication chamber 110. This valve element 119 shuts off induction port 108 when seated upon seat portion 118 at the boundary portion of induction port 108 and the inner part of pump communication chamber 110. In contrast, valve element 119, when the brake fluid pressure introduced to induction port 108 is greater than a predetermined value, moves in the upward direction, thereby opening the valve. In this way, induction port 108 is opened, and it becomes possible for brake fluid to flow to the intake side of pump 25 via discharge port 109. In between this valve element 119 and the wall face 110a of pump communication chamber 110, a valve element spring 120, which drives valve element 119 in the downward direction, is provided. Similarly, the lower end of piston 117 rests upon valve element 119. Furthermore, the open valve pressure of this valve element 119 is greater than the pressure force of master cylinder 1 which is added to the upper tip portion of piston 117 introduced from channel 121 to be described hereinafter, by the predetermined quantity of force from valve element spring 120. Furthermore, the aforementioned piston 117 and valve element 119 comprise the valve member, while valve element spring 120 comprises the urging force member.

Cup packing 122 is inserted into the lower part of master cylinder 112. At the upper portion of this cup packing 122 of master cylinder communication chamber 112, a return port 111 is provided connecting to channel 48. Cup packing 122 works in the same way as cup packing 100 in the aforementioned third embodiment. Channel 48, master cylinder 112, communication aperture 116, and pump communication chamber 110 principally comprise second bypass channel.

In the aforementioned seal chamber 113, a seal ring 123 is provided. By means of this seal ring 123, the communication of master cylinder communication chamber 112 and system communication chamber 115 is cut off.

By means of the brake fluid pressure control apparatus according to the fourth embodiment, during antiskid control, when pump 25 of system 5A, in order to discharge the brake fluid, moves from a maximum intake position to a maximum discharge position, pump 25 of system 5B, in order to take in the brake fluid, moves from a maximum discharge position to a maximum intake position. As a result, the brake fluid pressure of master cylinder 1 of system 5B, delivered via channel 121 to act on the upper tip portion of piston 117 of relief valve 107 in system 5A, has a tendency to decrease. In this way, relief valve 107 of system 5A decreases open valve pressure in response to rising of discharge pressure of pump 25 of the same system, gradually increasing the open valve amount as well as the brake fluid amount escaping to the intake side of pump 25. In contrast, when pump 25 of this system 5A, in order to take in brake fluid, moves from the maximum discharge position to the maximum intake position, pump 25 of system 5B, in order to discharge brake fluid, moves from a maximum intake position to a maximum discharge position; as a result, the brake fluid pressure of master cylinder 1 of system 5B delivered via channel 121 to act on the tip portion of piston 117 of relief valve 107 in system 5A, has a tendency to rise. In this way, relief valve 107 of system 5A increases open valve pressure in response to the lowering of discharge pressure of pump 25 of the same system, and gradually decreases the open valve amount as well as the amount of brake fluid escaping to the intake side of pump 25. In doing this, the pulsation of the brake fluid discharged to pump communication port 15 of flow control valve 8 is reduced. Furthermore, system 5B also follows the same procedure. Consequently, by virtue of brake fluid pressure control apparatus 104, using the pulsations of both pumps 25 of both systems 5A and 5B, possessing reversed intake and discharge phases, the pulsations of each pump 25 cancel each other out.

Consequently, stroke fluctuations of master cylinder 1 as well as so-called "pedal kickback" can be further effectively reduced, and unpleasant sensations generated by means of the pump pulsations, such as usage sounds, can also be decreased. Moreover, this simple construction contains few elements, and thus can be constructed at a low cost. In the aforementioned explanation, an example is give in which pump 25 of system 5A and pump 25 of system 5B had completely reversed intake and discharge phases. However, good results can also be obtained with a slight difference between these, i.e., non-complete reversal.

In the following, the fifth embodiment of the present invention will be explained with reference to FIG. 6. Furthermore, with respect to the aforementioned first embodiment, the fifth embodiment differs primarily in the relief valve, thus this explanation will focus on different portions, with portions similar to that of the aforementioned first embodiment being denoted by identical numbers without explanations.

In brake fluid pressure control apparatus 125 of the fifth embodiment, second bypass channel 126 is provided with communicates channel 24, between pump communication port 15 and discharge valve 28, and master cylinder 1 in a bypass manner. In first bypass channel 45 and second bypass channel 126, valve mechanism 129 is provided. This valve mechanism 129 is a unitary body constructed from relief valve 127 (which allows surplus discharge pressure from pump 25 to escape to reservoir 18) and control valve 128 (which closes when fluid pressure of master cylinder 1 from braking becomes high, and opens when fluid pressure of master cylinder released from braking lowers).

In this valve mechanism 129, pump communication chamber 130, seal chamber 131, control chamber 132, valve chamber 133, communication aperture 134, and bore 135 (one portion of second bypass channel 126) are provided. Seal chamber 131 is provided separated from pump communication chamber 130. Control chamber 132 is provided separated on the opposite side of seal chamber 131 with respect to pump communication chamber 130. Valve chamber 133 is also provided separated on the opposite side of control chamber 132 with respect to seal chamber 131. Communication aperture 134 penetrates through pump communication chamber 130, seal chamber 131, and control chamber 132. Bore 135 reciprocally communicates control chamber 132 and valve chamber 133. Furthermore, pump communication chamber 130, seal chamber 131, control chamber 132, valve chamber 133, communication aperture 134 and bore 135 are all arranged on the same axis.

Pump communication chamber 130 contains induction port 136 and discharge port 137. Induction port 136 is provided on the same axis on the opposite side of pump communication chamber 130 with respect to seal chamber 131, and communicates to channel 24 in between second bypass channel 126 and discharge valve 28. Discharge port 137 is provided orthogonal to pump communication chamber 130, and communicates to reservoir 28 of first bypass channel 45.

Control chamber 132 is constructed from small diameter chamber 138 and large diameter chamber 139 which has a predetermined diameter larger than small diameter chamber 138. Small diameter chamber 138 is provided closer to seal chamber 131 than large diameter chamber 139. Large diameter chamber 139 is provided on the side of small diameter chamber 138 opposite that facing seal chamber 131. In large diameter chamber 139, control port 140 and flow control valve communication port 141 are provided. Control port 140 is provided in the orthogonal direction to the axis of large diameter chamber 139 on the side of large diameter chamber 139 opposite that of small diameter chamber 138. This control port 140 communicates to master cylinder 1. Flow control valve communication port 141 is provided opposite to control port 140; this flow control valve communication port 141 communicates to master cylinder communication port 11 of flow control valve 8.

In valve chamber 133, valve chamber port 142 is provided. Valve chamber port 142 is provided in the direction orthogonal to the axis of valve chamber 133, and this valve chamber port 142 communicates to the discharge side of pump 25 via second bypass channel 126.

Valve element 143 possessing a smaller diameter than that of pump communication chamber 130 is inserted inside pump communication chamber 130. On this valve element 143, a valve part 144 is provided on the induction port 136 side which allows the closing off of this induction port 136. On the opposite side of valve element 143, in relation to valve part 144, spring insert hole 145 is provided. Valve element spring 146, providing a predetermined force, is set upon one end of bottom portion 147, and is inserted into spring insert hole 145.

Control piston 148 is inserted into communication aperture 134 and control chamber 132. On this control piston 148 are provided axle portion 149, piston portion 150, contact portion 154, and rod portion 156. Axle portion 149 is inserted into communication aperture 134, and together with this, one end of valve element spring 146 is inserted into the tip portion nearest pump communication chamber 130. Piston 150 is provided on the axle portion 149 side closest to valve chamber 133; this piston portion 150 has a predetermined diameter larger than that of axle portion 149, and is fittingly inserted into large diameter chamber 139 of control chamber 132 in a manner such that it is movable. In between piston portion 150 and the end portion 151 of control chamber 132, on the seal chamber 131 side, a spring 152 providing a predetermined force is provided. Contact portion 154 is provided on the side of piston portion 150 opposite that of axle portion 149. This contact portion 154 can rest on end portion 153 of control chamber 132 on the valve chamber 133 side without closing off bore 135. Rod portion 156 is provided on the side of contact portion 154 opposite to that of piston 150. This rod portion 156 is constructed with a diameter smaller than that of bore 135, and is responsible for the opening and closing of control valve element 155 (to be described hereinafter) of valve chamber 133. Furthermore, at the outer peripheral portion of piston portion 150 of control piston 148, a piston seal 157 is provided which prevents leakage of brake fluid passing over the aforementioned piston portion 150.

In valve chamber 133, control valve element 155, which can close bore 135, is provided. In between control valve element 155 and the end portion 158 of valve chamber 133 opposite bore 135, spring 159, which provides a predetermined force, is provided. In seal chamber 131, seal member 160 is provided which prevents leakage of brake fluid of pump communication chamber 130 into small diameter chamber 138 via communication aperture 134 with axle portion 149 inserted.

Furthermore, the above valve element 143, valve element spring 146 and control piston 148 principally comprise relief valve 127, while control piston 148, spring 152, spring 159, and control valve element 155 principally comprise control valve 128.

Figure 6:
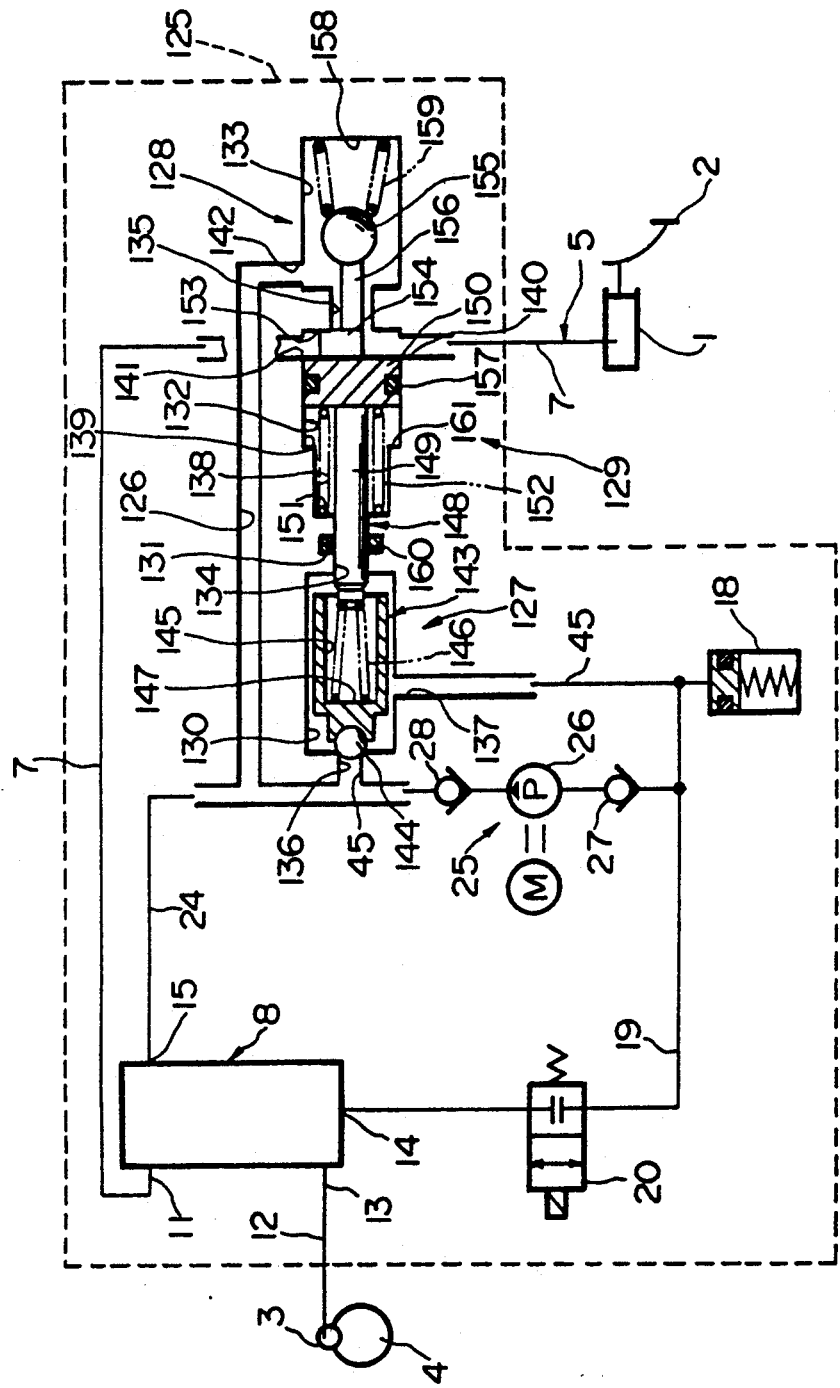
FIG. 6 schematically shows an outline of the construction of a brake fluid pressure adjustment apparatus according to the fifth preferred embodiment.

By means of brake fluid pressure control apparatus 125 of the above construction, as shown in FIG. 6, in the condition in which braking is not being carried out, control piston 148 of valve mechanism 129, by means of the force provided by spring 152, sets contact portion 154 onto the end portion 153 of control chamber 132 facing valve chamber 133, and stops. In this manner, rod portion 156 of control piston 148 opposes the force of spring 159, and urges control valve element 155 to move in the direction opposite that of control chamber 132, opening up bore 135. Additionally, valve element 143 enters a condition in which it moves towards the induction port 136.

After moving from the aforementioned condition to a braking condition, when brake fluid pressure is generated from the master cylinder 1, this fluid pressure of master cylinder 1 passes through control port 140, flows into control chamber 132, and acts on piston portion 150 of control piston 148. Together with this, the fluid pressure from master cylinder 1 passes through flow control valve communication port 141 and is delivered to master cylinder communication port 11 of flow control valve 8. Similarly, by means of the aforementioned brake fluid pressure acting on piston portion 150, control piston 148 opposes the force provided by spring 151, moves in the direction of pump communication chamber 130, and contacts step portion 161 between large diameter chamber 139 and small diameter chamber 138. As a result, contact between control valve element 155 and rod portion 156 of control piston 148 is released, and control valve element 155 closes bore 135 by means of the force provided by spring 159. In contrast, by means of moving axle portion 149 of the aforementioned control piston 148, valve element spring 146 is compressed, and by means of this compression of valve element spring 146, valve element 143 is designed to maintain induction port 136 in a closed state.

In this condition, in a case of antiskid control action, when the discharge pressure of pump 25, which is greater than the force provided by the aforementioned compression of valve element spring 146, acts on valve element 143, this valve element 143 opposes the force of valve element spring 146, moves in the direction of control chamber 132, and opens up induction port 136. In this manner, the surplus discharge pressure of pump 25 is allowed to escape to reservoir 18 via first bypass channel 45. Additionally, the discharge pressure of pump 25 delivered to pump communication port 15 is designed to be controlled at approximately a fixed rate. On the other hand, the discharge pressure of pump 25 at this time is also designed to be delivered to valve chamber 133 via second bypass channel 126. However, because bore 135 of valve chamber 133 is closed off by means of control valve element 155, there is no delivery of this discharge pressure to master chamber 1 via second bypass channel 126.

During this above antiskid control, after braking is released, when the fluid pressure of master cylinder 1 lowers, the fluid pressure to act on piston portion 150 is designed to also lower. As a result, as shown in FIG. 6, control piston 150 moves towards valve chamber 133 by means of the force provided by spring 152, and sets its contact portion 154 in contact with end portion 153. In this way, control valve element 155 opposes spring 159, and moves in the direction opposite that of control chamber 132 opening up bore 135. As a result of this, the fluid remaining inside reservoir 18 discharged/taken in from pump 25 is designed to return directly to master cylinder 1 via second bypass channel 126. Consequently, during antiskid control, in the case when braking is released, because the brake fluid discharged to flow control valve 8 disappears, the brake fluid flowing to wheel cylinder 3 also disappears. Therefore, there is no occurrence of the overshoot phenomenon, and fluid pressure of wheel cylinder 3 is rapidly reduced in response to release of braking.

In the following, a brake fluid pressure control apparatus according to the sixth embodiment of the present invention will be explained with reference to FIG. 7. Furthermore, in regards to the fifth embodiment, the sixth embodiment differs primarily in that the open valve pressure of the relief valve is arranged to follow the fluid pressure of channel 7 generated by the master cylinder; additionally, the relief valve and the control valve, are individually constructed. The following explanation will thus center around the portions which are different.

In brake fluid pressure control apparatus 163 according to the sixth embodiment, as in the fifth embodiment, first bypass channel 45 (connecting in a bypass manner the discharging side of pump 25 and reservoir 18) and second bypass channel 126 (connecting in a bypass manner channel 24 between pump communication port 15 and discharge valve 28 and master cylinder 1) are provided.

In first bypass channel 45, a relief valve 164 is provided which will be described below.

In this relief valve there are provided pump communication chamber 165, seal chamber 166, master cylinder communication chamber 167, and communication aperture 168. Seal chamber 166 is provided separated from pump communication chamber 165. Master cylinder 167 is provided on the side of seal chamber 166 opposite that of pump communication chamber 165. Communication aperture 168 penetrates through pump communication chamber 165, seal chamber 166, and master cylinder communication chamber 167. Furthermore, pump communication chamber 165, seal chamber 166, master cylinder communication chamber 167, and communication aperture 168 are all arranged in a straight line.

Pump communication chamber 165 contains induction port 169 and discharge port 170. Induction port 169 is provided on the side of pump communication chamber 165 opposite that of seal chamber 166, lying of the same axis as that of pump communication chamber 165, and connecting to discharge side of pump 25 of first bypass channel 45. Discharge port 170 is provided orthogonal to pump communication chamber 165.

Master cylinder communication chamber 167 contains control port 171 and coupling port 172. Control port 171 in a direction orthogonal to the axis of master cylinder communication chamber 167, and communicates to master cylinder 1. Coupling port 172 is provided on the side of master cylinder communication chamber 167 opposite that of control port 171.

Inside pump communication chamber 165, valve element 173 which can close off induction port 169, is provided. In between this valve element 173 and the end portion 177 of pump communication chamber 165 closest to seal chamber 166, a valve element spring 174 is provided which provides a predetermined force.

Into communication aperture 168, a piston 175, one tip of which is in contact with valve element 173 inside pump communication chamber 165, and the other tip of which projects out into master cylinder communication chamber 167, is inserted.

Additionally, in seal chamber 166, a seal member 176 is provided which seals communication aperture 168 with piston 175 inserted therein Furthermore, the aforementioned valve element and piston 175 comprise the valve member, while valve element spring 174 comprises the force member.

On the other hand, a control valve 178 is provided in second bypass circuit 126 which closes when the fluid pressure of master cylinder 1 from braking increases, and opens when fluid pressure of master cylinder 1 decreases following release of braking.

In the following, this control valve 178 will be explained. In this control valve 178 are provided valve chamber 179, control chamber 180, and bore 181 (the portion of second bypass circuit 126). Control chamber 180 is provided separated from valve chamber 179. Bore 181 is provided between valve chamber 179 and control chamber 180, connecting the two chambers. Furthermore, valve chamber 179, control chamber 180, and bore 181 are all arranged on the same axis.

In valve chamber 179, valve chamber port 182 is provided. This valve chamber port 182 is provided on the same axis as valve chamber 179 on the side opposite that of control chamber 178, and communicates to the discharge side of pump 25 of second bypass circuit 126. Control chamber 180 is constructed from small diameter chamber 183, large diameter chamber 184, and communication chamber 185. Large diameter chamber 184 is provided on the valve chamber 179 side of small diameter chamber 183 and is formed at a predetermined diameter greater than that of small diameter chamber 183. Communication chamber 185 is provided on the valve chamber 179 side of large diameter chamber 184, and is formed at a predetermined diameter smaller than that of large chamber 184; similarly, at the juncture of communication chamber 185 and bore 181, a flow control valve communication port 186 is provided in the orthogonal direction to the axis of the aforementioned communication chamber 185. This flow control valve communication port 186 communicates to master cylinder communication chamber 11 of flow control valve 8. Additionally, the aforementioned communication port 172 is communicated to the opposite side of flow control valve communication port 186.

Inside valve chamber 179, control valve element 187 is provided which can close up bore 181. In between this control valve element 187 and end portion 188 of valve chamber 179 on the valve chamber port 182 side, a spring 189 which provides a predetermined force is provided.

Control piston 190 is inserted into control chamber 178 and bore 181. This control piston 190 has a rod portion 191, coupling portion 192, piston portion 193 and axle portion 194. Rod portion 191 is formed at a diameter smaller than bore 181, and can be inserted into bore 181 as well as set in contact with control valve element 187. Coupling portion 192 is provided on the side of rod portion 191 opposite that of valve chamber 179, and is constructed at a diameter smaller than that of communication chamber 185. Piston portion 193 is provided on the side of coupling portion 192 opposite that of valve chamber 179, and is inserted into large diameter chamber 184 in a manner so that it is movable. Axle portion 194 is provided on the side of piston portion 193 opposite that of valve chamber 179, and is formed at a diameter smaller than that of small diameter chamber 183. Furthermore, in between piston portion 193 and end portion 195 of small diameter chamber 183 opposite that of valve chamber 179, a spring 196 is provided, on the inner side of which axle portion 194 is inserted, provides a predetermined force. Furthermore, on the periphery of piston portion 193 of control piston 190, a piston seal 197 is provided which prevents leakage of brake fluid via large diameter chamber 184 with piston portion 193 inserted therein.

Figure 7:
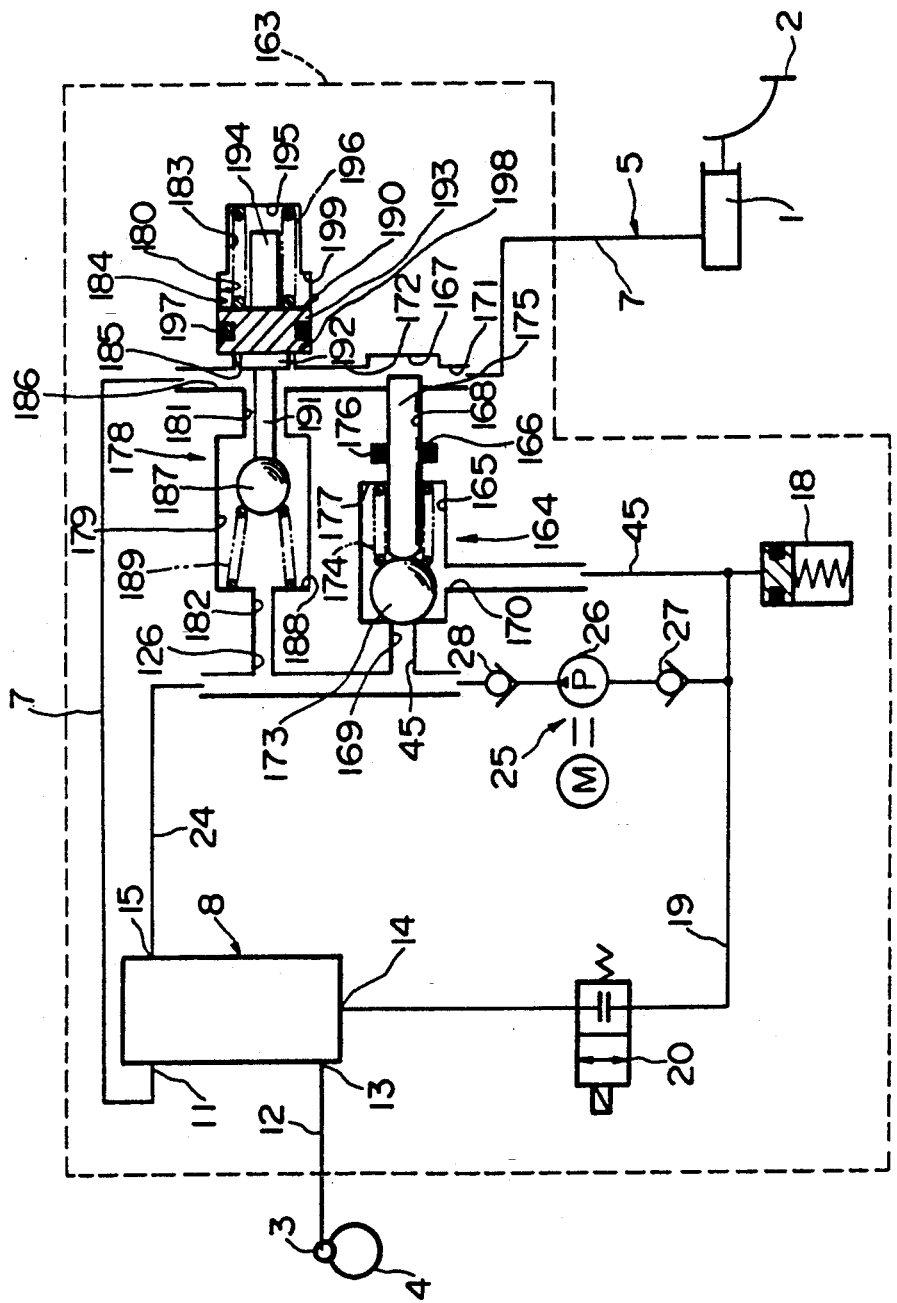
FIG. 7 schematically shows an outline of the construction of a brake fluid pressure adjustment apparatus according to a sixth preferred embodiment.

In the condition in which braking is not being carried out, as shown in FIG. 7, control piston 190 of control valve 178, by means of the force provided by spring 196, places piston portion 193 in contact with step portion 198 in between large diameter chamber 184 and communication chamber 185, and stops there. At this time, control valve element 187, by means of rod portion 191 of control piston 190 opposes the force provided by spring 189, moves in the direction opposite that of control chamber 180, and opens up bore 181. Additionally, during this time, valve element 173 of relief valve 164 covers up induction port 169 by means of the force provided by valve element spring 174.

After the aforementioned condition is shifted to a braking condition, when brake fluid pressure is generated from master cylinder 1, this fluid pressure of master cylinder 1 acts on piston portion 193 and coupling portion 192 of control valve 178. As a result, control piston 190 opposes the force of spring 196 and moves in the opposite direction to that of valve chamber 179. When this happens, control piston 190 is designed to come into contact with step portion 199 between large diameter chamber 184 and small diameter chamber 183. In this way, the contact between control valve element 187 and rod portion 191 of control piston 190 is released. When this occurs, control valve element 187 covers up bore 181 by means of the force provided by spring 189. On the other hand, at this time, because the fluid pressure of master cylinder 1 acts on piston 175 which projects out from master cylinder communication chamber 167, relief valve 164 is designed to maintain closure of induction port 169 by means of the fluid pressure of master cylinder 1 and force of spring 175.

In the above condition, in the case when antiskid control is being carried out, when the discharge pressure of pump 25 exceeds that of the combined force of fluid pressure from master cylinder 1 to act on piston 175 and the force provided by valve element spring 174, valve element 173 of relief valve 164 moves towards master cylinder communication chamber 167, opening up induction port 169. In doing this, surplus discharge pressure of pump 25 is allowed to escape to reservoir 18 by means of first bypass circuit 45. As a result, the discharge pressure pump 25 to be delivered to pump communication port 15 of flow control valve 8, is designed to be controlled at approximately the same level as the combined force of the pressure force of master cylinder 1 and the predetermined force provided by valve element spring 174. Furthermore, at this time, the discharge pressure of pump 25 is designed to be delivered to valve chamber 179 of control valve 178 via second bypass circuit 126; however, because bore 181 is closed off by control valve element 187, the circulation of this discharge pressure to master cylinder 1 via second bypass circuit 126 is not carried out.

During the above antiskid control, after braking is released, when fluid pressure of master cylinder 1 decreases, the fluid pressure to act on piston portion 193 and coupling portion 192 of control piston 190 is designed to also decrease. As a result, control piston 190, by means of the force provided by spring 196, moves in the valve chamber 179 direction, and places piston portion 193 in contact with end portion 198 of control chamber 180, as shown in FIG. 7. In this manner, control valve element 187 opposes the force of spring 189, moves in the direction opposite that of control chamber 180, and opens up bore 181. The residue liquid inside reservoir 18 taken in/discharged from pump 25 is thus designed to return directly to master cylinder 1 via second bypass circuit 126. Consequently, in a manner similar to that in the fifth embodiment, during antiskid control, when braking is released, because the brake fluid discharged to flow control valve 8 disappears, the brake fluid flowing to wheel cylinder 3 similarly disappears. Therefore, generation of the overshoot phenomenon does not occur, and fluid pressure of wheel cylinder 3 can be rapidly decreased in response to the release of braking.

Figure 8:
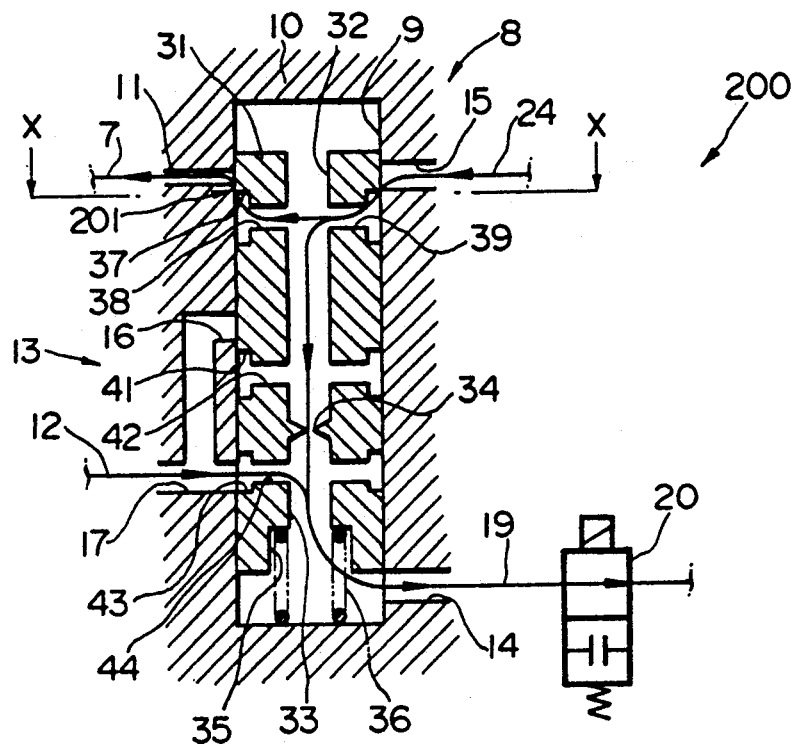
FIG. 8 schematically shows an outline of the construction of a flow control valve and a first valve of a brake fluid pressure adjustment apparatus according a seventh preferred embodiment.
Figure 9:
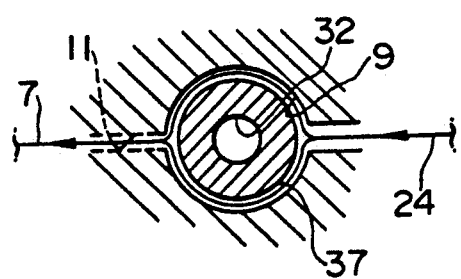
FIG. 9 is a cross sectional view taken along the line X—X shown in FIG. 8.

In the following, brake fluid pressure control apparatus according to the seventh embodiment of the present invention will be explained with reference to FIGS. 8 and 9. Furthermore, in regard to the second embodiment, the seventh embodiment differs primarily in one portion of the flow control valve, thus the following explanation will concentrate on this differing portion, omitting details on the parts similar to the apparatus according to the second embodiment denoted by identical numbers.

In brake fluid control apparatus 200 according to the seventh embodiment, master cylinder communication port 11 is designed at a predetermined diameter smaller than that of pump communication port 15. In this way, when spool 31 enters a moving state, first groove 37 is constructed in a manner such that it communicates to pump communication port 15 by its end portion opposite the direction of movement (the upper part in FIG. 8), in a state in which it does not directly connect to master cylinder communication port 11.

Furthermore, during antiskid control, pump 25 is normally in a driving state. When spool 31 moves, first groove 37 of spool 31 is designed to connect to pump communication port 15 by the end portion of first groove 37 opposite the direction of movement. At this time, because the diameter of master cylinder communication port 11 is designed at a predetermined diameter smaller than that of pump communication port 15, master cylinder communication port 11 is designed to slightly connect via clearance 201 formed from the outer periphery portion of spool 31 between master cylinder communication port 11 and first groove 37, and the inner periphery portion of cylinder 9 of casing 10, without directly connecting to first groove 37. As a result, the brake fluid discharged from pump 25, at the time of depressurization with the opening of electromagnetic normally closed valve 20, flows from pump communication port 15 to reservoir 18 at approximately a fixed flow amount via first groove 37, second aperture 39, upper portion aperture 32, interior orifice 34, lower portion aperture 33, and reservoir communication port 14 by means of extraction at interior orifice 34. Additionally, during closing of electromagnetic first valve 20 and repressurization, brake fluid discharged from pump 25 flows from pump communication port 15 to wheel cylinder 3 via first groove 37, second aperture 39, upper portion aperture 32, interior orifice 34, lower portion aperture 33, fourth aperture 44, third groove 43, and lower portion part 17 of wheel cylinder communication port 13, at approximately a fixed flow amount by means of extraction at interior orifice 34. At the same time, a minute portion of the brake fluid discharged from pump 25 is extracted by means of clearance 201 formed from the aforementioned outer periphery portion of spool 31 and the inner periphery portion of casing 10, and is designed to return to master cylinder 1 at approximately a fixed flow amount (see FIG. 9).

Consequently, the aforementioned clearance 201 becomes a second orifice connecting pump communication port 15 and master cylinder communication port 11, and prevents unpleasant pedal sensations such as pedal kickback. Moreover, there is no longer a need for the passageway connecting master cylinder communication port 11 and pump communication port 15, and the outer orifice to be provided in casing 10. As a result, the entire body of brake fluid pressure control apparatus 200 can be made more compact and the manufacturing cost can be lowered.

Moreover, in the present embodiment, relief valve 47 (see FIG. 4) is designed to control the discharge pressure to be delivered from pump 25 to pump communication port 15 at a predetermined pressure level greater than the pressure force of master cylinder 1. Due to this, when the discharge pressure of pump 25 is greater than the pressure force of master cylinder 1, the difference between the brake fluid pressure of master cylinder 1 and the brake fluid pressure delivered to flow control valve 8 via relief valve 47 becomes fixed. This brake fluid possessing this difference in pressure is designed to pass through interior orifice 34 and the aforementioned clearance 201. Consequently, fluctuations of pressure force delivered to master cylinder 1 via the aforementioned clearance 201 can be effectively further prevented. Similarly, relief valve 47 is designed to prevent unnecessary rising of the brake fluid pressure between the discharging side of pump 25 and flow control valve 8.

Figure 10:
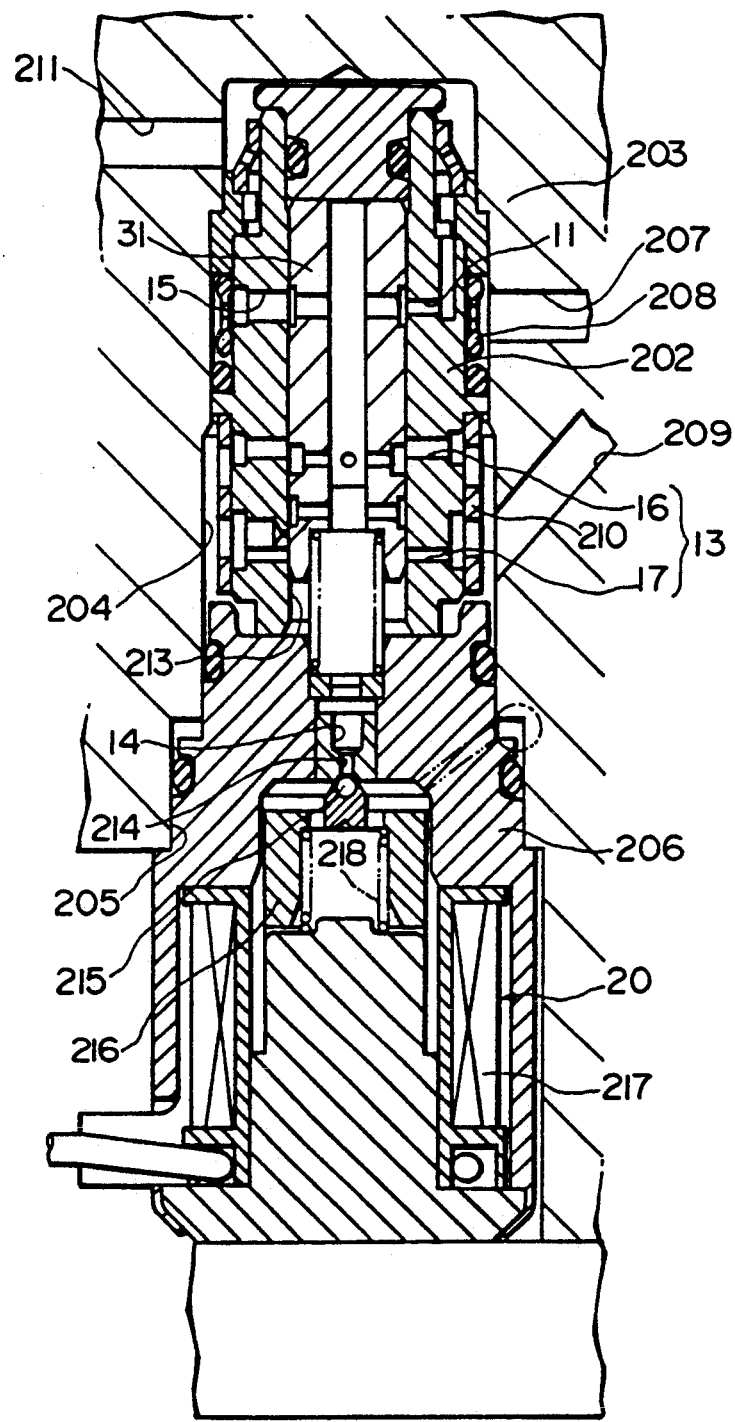
FIG. 10 is a constructional outline showing a modification of a brake fluid pressure adjustment apparatus according a seventh preferred embodiment.

In the following, a modified example of the seventh preferred embodiment is described as shown in FIG. 10. Furthermore, this modified example is a unitary body formed from the aforementioned flow control valve 8 and electromagnetic first valve 20, the individual constructions of which are identical to that stated in the aforementioned embodiments.

Flow control valve 8 is inserted inside sleeve (casing) 202. Inside of this sleeve 202, master cylinder communication port 11, wheel cylinder communication port 13, and pump communication port 15 are all provided in predetermined positions. This sleeve 202 is inserted into both spool 31 and opening 204 of housing 203. Opening portion 205 of housing 203 is designed to be closed off by closing member 206, and sleeve 202 is fixed to housing 203. Master cylinder communication port 11 of sleeve 202 is communicated to channel 211 of housing 203, and in turn this channel 211 is communicated to the master cylinder. Wheel cylinder communication port 13 is communicated to channel 209 of housing 203 via filter 210 and this channel 209 is in turn communicated to the wheel cylinder. Additionally, pump communication port 15 communicates to channel 207 of housing 203 via filter 208: this channel 207 communicates with the pump. Additionally, an opening portion 213 at the lower part of sleeve pump port 202 in FIG. 10, is communicated to reservoir communication port 14 which is enclosed in closing member 206; in this closing member 206, an electromagnetic first valve 20 which communicates and cuts off channel 214 which in turn is communicated to reservoir communication port 14. This electromagnetic first valve 20 is constructed from armature 216, on which valve portion 215 which communicates and cuts off channel 214 is provided. Electromagnetic portion 217 which by means of magnetization moves this armature 216 and communicates channel 214, and spring 218 which, in the condition when electromagnetic portion 217 is not magnetized, provides a force to armature 216, closes channel 214 using armature 216.

In the following, a brake fluid pressure control apparatus according to the eighth embodiment of the present invention will be explained with reference to FIG. 11. Furthermore, in regards to the seventh embodiment, the eighth embodiment differs primarily in a portion of the spool of the flow control valve, thus the explanation will center mainly around this differing portion, omitting explanations of portions similar to that described in the seventh embodiment as denoted by identical numbers.

On the outer periphery portion of spool 31 in flow control valve 8 of brake fluid pressure control apparatus 219 according to the eighth embodiment, at a predetermined distance higher than the first groove portion 37, a V-shaped minute groove 220 is provided around the entire circumference. This minute groove 220, when there is no action of antiskid control and when spool 31 is in a motionless state, does not open master cylinder communication port 11 and pump communication port 15; when antiskid control is being carried out, and when spool 31 is in a moving state, this minute groove 220 opens, creating a minute communication between master cylinder communication port 11 and pump communication port 15.

Figure 11:
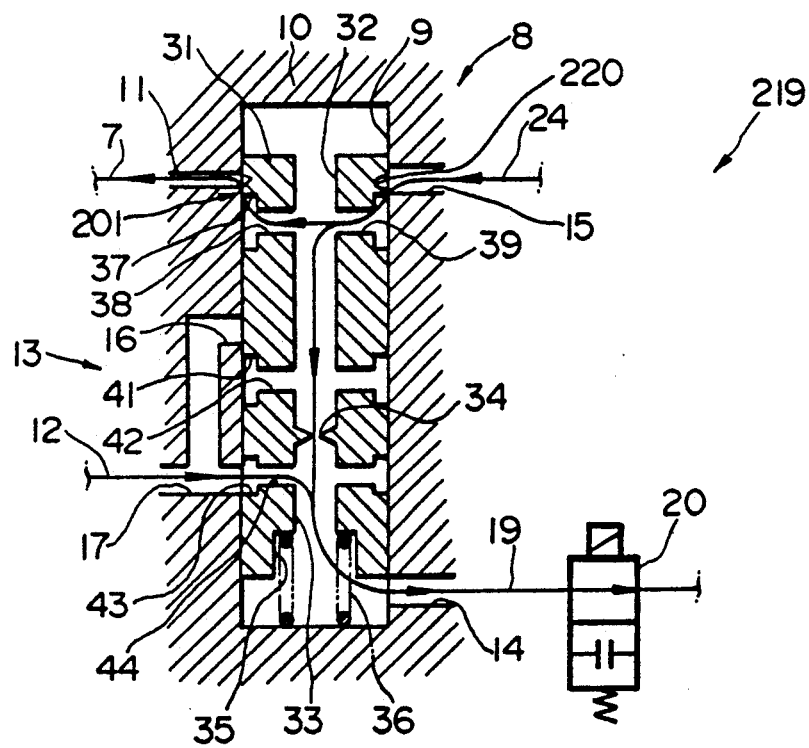
FIG. 11 is a constructional outline showing a flow control valve and a first valve of a brake fluid pressure adjustment apparatus according to an eighth preferred embodiment.
Figure 12:
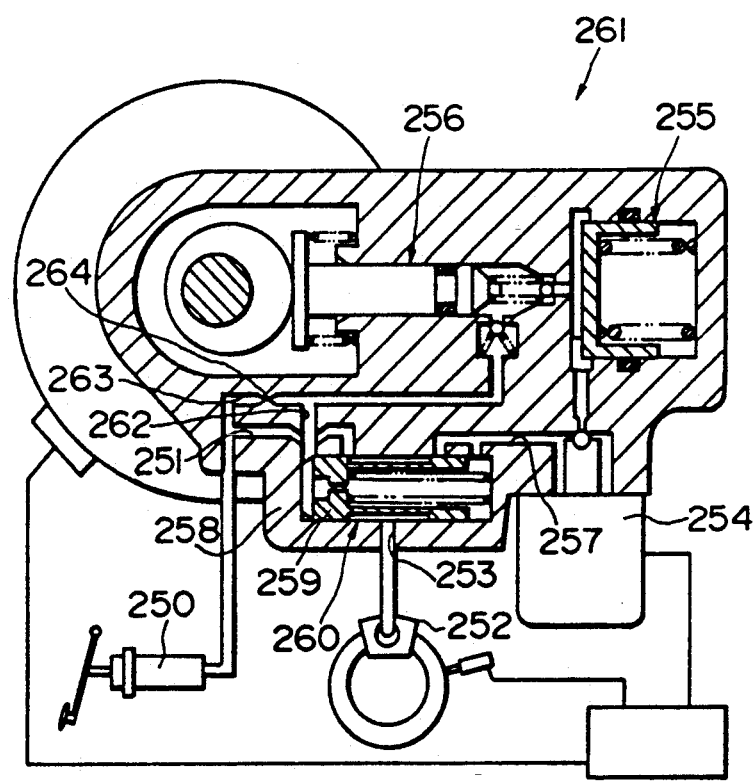
FIG. 12 is a constructional outline showing a prior art brake fluid pressure adjustment apparatus.

In this way, as shown in FIG. 11, during antiskid control, when spool 31 of control valve 8 moves, first groove 37, in the same manner as in the seventh embodiment, communicates to pump communication port 15 using the tip portion of spool 31 in the direction of movement. At the same time as this, spool 31 becomes minutely communicated to the aforementioned master cylinder communication port 11 via clearance 201 between spool 31 and master cylinder communication port 11. Together with this, minute groove 220 minutely communicates pump communication port 15 and master cylinder communication port 11.

Consequently, clearance 201 between master cylinder communication port 11 and first groove 37, and minute groove 220 form a second orifice. By means of this, clearance 201 and minute groove 220, a portion of brake fluid discharged from pump 25 to pump communication port 15 via relief valve 47 (see FIG. 4), is designed to be squeezed out, and returned to master cylinder 1 at approximately a fixed flow rate. As a result, in a manner similar to that for the seventh embodiment, unpleasant pedal kickback can be prevented, and there is no longer a necessity for a channel connecting master cylinder communication port 11 and pump communication port 15 and exterior orifice to be provided in casing 10. Due to this, brake fluid pressure control apparatus 219 can be made compact and manufacturing costs can be reduced.

Furthermore, because the size of this minute groove 220 can be easily changed, modifications in the size of the flow path area over which brake fluid, passing through flow control valve 8 and returning to master cylinder 1, passes, can be carried out. That is namely, modification of the flow amount of brake fluid returning to master cylinder 1, can be carried out. Consequently, in the case when recognition of the antiskid control state through a pedal is preferred, pedal kickback can be designed over a range in which unpleasant sensations do not occur. Additionally, due to the presence of this minute groove 220, as shown in FIG. 11, even when for example spool 31 is fixed, safety is an advantage since small communications of each port can be maintained.

What is claimed is:

1. A brake fluid pressure control apparatus possessing anti-skid control function which, in order to perform anti-skid control of vehicles, carries out in response to the behavior of the vehicle wheels, pressure decrease and pressure increase of brake fluid pressure supplied from a master cylinder, connecting to a brake pedal, to a wheel cylinder which performs braking of the vehicle wheels, said brake fluid pressure control apparatus provided between said master cylinder and said wheel cylinder and comprising:
   a normally closed valve which opens when brake fluid pressure decreases and closes when brake fluid pressure increases,
   a reservoir for receiving brake fluid during brake fluid pressure decrease,
   a pump which intakes brake fluid inside of said reservoir and discharges this brake fluid,
   a flow valve comprising:
   A. a casing comprising:
      i. master cylinder communication port communicating to said master cylinder,
      ii. wheel cylinder communication port communicating to said wheel cylinder,
      iii. reservoir communication port communicating to said reservoir and intake side of said pump via said normally closed value, and
      iv. pump communication port communicating to a discharge side of said pump,
   B. a spool provided movably inside said casing, said spool, at the time of anti-skid control, moves by means of a difference in pressure created on both sides of said spool due to opening of the normally closed valve, and together with limiting communication between said master cylinder communication port and said wheel cylinder communication port, said spool intakes brake fluid from said pump communication port which was discharged from said pump, and supplies this brake fluid to one of said wheel cylinder communication port and said reservoir communication port in an approximate fixed flow amount via an inner orifice provided on an inner portion of said spool,
   wherein a groove portion, provided on the periphery of said spool, communicates to said pump communication port during anti-skid control by means of a part of said groove portion which lies opposite a direction of movement of said spool,
   an axis of said pump communication port and an axis of said master cylinder communication port are arranged so that they are positioned on a plane which lies orthogonal to the direction of movement of said spool, and the diameter of said master cylinder communication port is formed smaller than the diameter of said pump communication port by a predetermined amount in a manner such that during anti-skid control said master cylinder communication port does not communicate directly with said groove portion.

2. A brake fluid pressure control apparatus according to claim 1 wherein said pump communication port and said master cylinder communication port are coaxial.

3. A brake fluid pressure control apparatus according to claim 1, wherein a minute groove is provided on the periphery of said spool, said minute groove communicating said pump communication port and said master cylinder communication port during anti-skid control.

4. A brake fluid pressure control apparatus according to claim 1 wherein said groove portion is provided around the entire periphery of said spool at a predetermined width.

5. A brake fluid pressure control apparatus according to claim 1 wherein a sleeve member is inserted in a fixed manner inside said casing thereby forming a part of said casing, said master cylinder communication port, said wheel cylinder port and said pump communication port are formed in said sleeve member.

* * * * *

UNITED STATES PATENT AND TRADEMARK OFFICE
CERTIFICATE OF CORRECTION

PATENT NO. : 5,303,990
DATED : April 19, 1994
INVENTOR(S) : Hiromi Ando and Kenji Sano It is certified that error appears in the above-indentified patent and that said Letters Patent is hereby corrected as shown below:

On the cover page at item [75], "Hiromi Ando; Satoru Suga"

should be --Hiromi Ando; Kenji Sano--.

Signed and Sealed this

Twenty-second Day of November, 1994

Attest:

BRUCE LEHMAN

*Attesting Officer*  *Commissioner of Patents and Trademarks*